United States Patent
Yuda et al.

(10) Patent No.: US 9,713,028 B2
(45) Date of Patent: *Jul. 18, 2017

(54) WIRELESS COMMUNICATION TERMINAL AND COMMUNICATION METHOD FOR MEASURING A CHANNEL QUALITY INDICATOR (CQI)

(71) Applicant: Sun Patent Trust, New York, NY (US)

(72) Inventors: Yasuaki Yuda, Kanagawa (JP); Seigo Nakao, Kanagawa (JP); Ayako Horiuchi, Kanagawa (JP); Daichi Imamura, Kanagawa (JP); Masayuki Hoshino, Kanagawa (JP); Atsushi Sumasu, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,473

(22) Filed: Jun. 9, 2016

(65) Prior Publication Data
US 2016/0295445 A1  Oct. 6, 2016

Related U.S. Application Data

(63) Continuation of application No. 13/266,634, filed as application No. PCT/JP2010/003289 on May 14, 2010, now Pat. No. 9,392,480.

(30) Foreign Application Priority Data

May 15, 2009  (JP) ................................. 2009-119104

(51) Int. Cl.
*H04W 24/10*  (2009.01)
*H04L 1/00*  (2006.01)
(Continued)

(52) U.S. Cl.
CPC ........... *H04W 24/10* (2013.01); *H04L 1/0026* (2013.01); *H04L 1/20* (2013.01); *H04L 5/0057* (2013.01);
(Continued)

(58) Field of Classification Search
CPC ... H04W 24/02; H04W 24/10; H04W 84/047; H04L 1/20; H04L 1/0026; H04L 5/0057; H04L 12/189; H04L 27/28; H04B 7/2606
See application file for complete search history.

(56) References Cited

U.S. PATENT DOCUMENTS 7,209,712 B2  4/2007  Holtzman
7,952,991 B2  5/2011  Kim et al.
(Continued)

FOREIGN PATENT DOCUMENTS

CN  101222728 A  7/2008
EP  1 750 399 A1  2/2007
(Continued)

OTHER PUBLICATIONS

3GPP TS 36.213 V8.5.0, 3rd Generation Partnership Project, Technical Specification Group Radio Access Network, Evolved Universal Terrestrial Radio Access (E-UTRA), Physical Layer Procedures, Release 8, Dec. 2008, pp. 1-74.
(Continued)

*Primary Examiner* — Habte Mered
(74) *Attorney, Agent, or Firm* — Seed IP Law Group LLP

(57) ABSTRACT

To measure the channel quality of the own cell accurately in a condition where there is no interference from a neighbor cell. A wireless communication terminal according to the invention is a wireless communication terminal to be connected to a base station for transmitting and receiving data to/from the base station, the wireless communication terminal including: a receiver that receives a signal which
(Continued)

includes control information provided for measuring a channel quality of own cell from the base station; an extractor that extracts the control information from the signal received by the receiver; a measurement section that measures, on the basis of the control information, the channel quality of the own cell in a domain where a neighbor cell does not transmit a signal; and a transmitter that transmits a measurement result of the channel quality of the own cell measured by the measurement section, to the base station.

14 Claims, 15 Drawing Sheets

(51) Int. Cl.
    *H04L 1/20*     (2006.01)
    *H04L 5/00*     (2006.01)
    *H04L 12/18*     (2006.01)
    *H04L 27/28*     (2006.01)
    *H04W 24/02*     (2009.01)
    *H04B 7/26*     (2006.01)
    *H04W 84/04*     (2009.01)

(52) U.S. Cl.
    CPC .......... *H04L 12/189* (2013.01); *H04B 7/2606* (2013.01); *H04L 27/28* (2013.01); *H04W 24/02* (2013.01); *H04W 84/047* (2013.01)

(56) References Cited

U.S. PATENT DOCUMENTS

| | | |
|---|---|---|
| 2004/0009767 A1 | 1/2004 | Lee et al. |
| 2005/0111596 A1 | 5/2005 | Olsson et al. |
| 2007/0026810 A1 | 2/2007 | Love et al. |
| 2008/0045147 A1 | 2/2008 | Okuda |
| 2008/0232396 A1* | 9/2008 | Buckley .............. H04L 27/2613 370/465 |
| 2009/0041139 A1* | 2/2009 | Cho ..................... H04L 1/0026 375/260 |
| 2009/0093243 A1 | 4/2009 | Lee et al. |
| 2010/0027450 A1 | 2/2010 | Montojo et al. |
| 2010/0210256 A1 | 8/2010 | Shen et al. |
| 2010/0303013 A1 | 12/2010 | Khandekar et al. |
| 2011/0021224 A1 | 1/2011 | Koskinen et al. |
| 2011/0151773 A1 | 6/2011 | Okuda |
| 2011/0222411 A1 | 9/2011 | Koskinen et al. |
| 2016/0043828 A1 | 2/2016 | Love et al. |

FOREIGN PATENT DOCUMENTS

| | | |
|---|---|---|
| JP | 2006-500833 A | 1/2006 |
| JP | 2008-48202 A | 2/2008 |
| RU | 2291591 C2 | 1/2007 |
| WO | 2009/044345 A2 | 4/2009 |

OTHER PUBLICATIONS

3GPP TR 36.814 V0.4.1, 3rd Generation Partnership Project, Technical Specification Group Radio Access Network, Further Advancements for E-UTRA, Physical Layer Aspects, Release 9, Feb. 2009, pp. 1-31.

"3rd Generation Partnership Project; Technical Specification Group Radio Access Network; Evolved Universal Terrestrial Radio Access (E-UTRA); Physical Channels and Modulation (Release 8)," Technical Specification, 3GPP TS 36.211 V8.6.0, Mar. 2009, 83 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Technical Specification, 3GPP TS 36.300 V8.8.0, Mar. 2009, 157 pages.

Chinese Office Action and Search Report, dated Nov. 21, 2013, for corresponding Chinese Patent Application No. 201080021399.1, 15 pages. [With English Translation].

Higuchi et al., "Investigations on Relay Transmission Schemes in LTE-Advanced," Institute of Electronics, Information, and Communication Engineers, 2008, pp. 328. (with partial English Translation).

International Search Report for PCT/JP2010/003289, mailed Aug. 17, 2010, 1 page.

Motorola, "LTE signaling to support Relay operation," R1-084412, 3GPP TSG RAN WG1 Meeting #55, Prague, Czech Republic, Nov. 10-14, 2008, 6 pages.

Panasonic, "Discussion on the TD relay and FD relay for FDD system," R1-084232, Agenda Item: 11.5 Relaying, 3GPP TSG RAN WG1 Meeting #55, Prague, Czech Republic, Nov. 10-14, 2008, 7 pages.

Philips, NXP, Ericsson, Motorola, Nokia, Nokia Siemens Networks, Qualcomm, "CQI/PMI reference measurement periods," R1-083438, 3GPP TSG-RAN Meeting #54, Jeju, Korea, Aug. 18-22, 2008, 3 pages.

Russian Decision on Grant dated Jul. 2, 2014, for corresponding RU Application No. 2011144126/07(066164), 13 pages.

Russian Office Action, dated Feb. 12, 2014, for corresponding Russian patent application No. 2011144126/07(066164), 7 pages (including English translation).

Yuda et al., "A Comparison of FD/TD-Relay scheme for LTE-Advanced," Institute of Electronics, Information, and Communication Engineers, 2009, pp. S-54-S55. (with partial English Translation).

Extended European Search Report, dated Feb. 28, 2017, for corresponding EP Application No. 10774746.1-1854/2432291, 9 pages.

LG-Nortel, "Requirements and Configurations of Relay in Various Environments," R1-090566, 3GPP TSG RAN WG1 Meeting 56, Agenda Item: 12.5, Athens, Greece, Feb. 9-13, 2009, 12 pages.

Nortel, "Supporting relay for Rel-8 UE in downlink," R1-084460, 3GPP TSG RAN1 Meeting #55, Agenda Item: 11.5, Prague, Czech Republic, Nov. 10-14, 2008, 6 pages.

Potevio, "L1 Relay backward compatibility analysis," R1-091411, 3GPP TSG RAN WG1 #56bis, Agenda Item: 15.3, Seoul, Korea, Mar. 23-27, 2009, 7 pages.

* cited by examiner

WIRELESS COMMUNICATION TERMINAL AND COMMUNICATION METHOD FOR MEASURING A CHANNEL QUALITY INDICATOR (CQI)

TECHNICAL FIELD

The present invention relates to a wireless communication terminal and a communication method for transmitting and receiving data to and from a base station.

BACKGROUND ART

The 3GPP (3rd Generation Partnership Project) which is an international mobile communication standardization group has started the standardization of LTE-Advanced (Long Term Evolution-Advanced, LTE-A) as a fourth generation mobile communication system. As in Non-patent Literature 1, in LTE-A, a relay technology of relaying radio signals by using a relay node is being studied with the goals of coverage expansion and capacity improvement.

Now, referring to FIG. 20, the relay technology will be described. FIG. 20 is a diagram showing a wireless communication system that relays radio signals by using the relay technology. In FIG. 20, eNB represents a base station, RN represents a relay node, and UE represents a wireless communication terminal. Moreover, UE1 represents a wireless communication terminal connected to eNB, and UE2 represents a wireless communication terminal connected to RN.

In LTE-A, it is being studied that RN has an individual cell ID as in eNB, and thereby, when viewed from UE, RN can be regarded as one cell like eNB. eNB is connected to a network by wired communication, whereas RN is connected to eNB by wireless communication. A communication channel connecting between RN and eNB is called a backhaul channel. On the other hand, a communication channel connecting between eNB or RN and UE is called an access channel.

On the downlink channel, for example as shown in FIG. 20, RN receives signals from eNB on the backhaul channel (an arrow A in the figure), and transmits the signals to UE2 on the access channel of RN (an arrow B in the figure). When the backhaul channel and the access channel are allocated in the same frequency bandwidth, if RN performs transmission and reception at the same time, an interference due to feedback occurs. For this reason, RN cannot perform transmission and reception at the same time. Consequently, in LTE-A, a relay method is being studied in which the backhaul channel and the access channel of RN are allocated while being divided by the time domain (in units of subframes).

Referring to FIG. 21, the above-mentioned relay method will be described. FIG. 21 is a diagram showing the subframe structure on the downlink channel in the relay method. Reference designations [n, n+1, ... ] in the figure represent subframe numbers, and boxes in the figure represent subframes on the downlink channel. Moreover, the following are shown: transmission subframes of eNB (crosshatched parts in the figure), reception subframes of UE1 (blank parts in the figure), transmission subframes of RN (rightward hatched parts in the figure), and reception subframes of UE2 (leftward hatched parts in the figure).

As shown by the arrows (thick lines) in FIG. 21, signals are transmitted from eNB in all the subframes [n, n+1, ... , n+6]. Moreover, as shown by the arrows (thick lines) or the arrows (broken lines) in FIG. 21, UE1 is capable of performing reception in all the subframes. On the other hand, as shown by the arrows (broken lines) or the arrows (thin lines) in FIG. 21, at RN, signals are transmitted in the subframes except for the subframe numbers [n+2, n+6]. Moreover, as shown by the arrows (thin lines) of FIG. 21, UE2 is capable of receiving signals in the subframes except for the subframe numbers [n+2, n+6]. And RN receives signals from eNB in the subframes of the subframe numbers [n+2, n+6]. That is, at RN, the subframes of the subframe numbers [n+2, n+6] serve as the backhaul channel, and the other subframes serve as the access channel of RN.

However, if RN transmits no signal from eNB in the subframes [n+2, n+6] where RN serves as the backhaul, a problem arises in that a measurement operation to measure the quality of RN does not function at an LTE wireless communication terminal that does not know the presence of RN. As a method of solving this problem, in LTE-A, it is considered to use an MBSFN (Multicast/Broadcast over Single Frequency Network) subframe defined in LTE.

The MBSFN subframe is a subframe prepared to realize an MBMS (Multimedia Broadcast and Multicast Service) service in the future. The MBSFN subframe is designed to transmit cell-specific control information at the first two symbols and transmit signals for the MBMS in the domains of the third and subsequent symbols. Consequently, LTE wireless communication terminals are capable of performing measurement by using the first two symbols in the MBSFN subframe.

The MBSFN subframe can be spuriously used in RN cells. That is, in the RN cell, at the first two symbols of the MBSFN subframe, the control information specific to the RN cell is transmitted, and in the domains of the third and subsequent symbols, signals from eNB are received without the data for the MBMS being transmitted. Consequently, in RN cells, the MBSFN subframe can be used as the reception subframe on the backhaul channel. Hereinafter, the MBSFN subframe spuriously used in the RN cell as mentioned above will be called "MBSFN subframe that RN uses as the backhaul".

Here, in the subframes [n+2, n+6] of RN in FIG. 21, since no signal is transmitted from RN, for UE1, the interference from RN is eliminated, so that SIR (signal to interference power ratio) improves. eNB positively allocates UE where SIR improves in the subframes [n+2, n+6], so that the user throughput at UE improves and this improves the throughput of the whole cells. Therefore, to improve the throughput of the whole cells, it is necessary for eNB to know the channel quality at UE.

CITATION LIST

Non-Patent Literature

Non-patent Literature 1:3GPP TR36.814 v0.4.1 (2009-02) "Further Advancements for E-UTRA Physical Layer Aspects (Release 9)"

Non-patent Literature 2:3GPP TS36.213 v8.5.0 (2008-12) "Physical layer procedures (Release 8)"

SUMMARY OF INVENTION

Technical Problem

However, in the CQI measurement of LTE, if there is an interference from RN in the resource where the CQI is measured, UE1 under the control of eNB cannot accurately measure the CQI of a case where no interference from RN appears.

Here, the CQI (Channel Quality Indicator) is the quality of the reception channel when viewed from the receiving side. The CQI is fed back from the receiving side to the transmitting side, and according to the fed-back CQI, the transmitting side selects the modulation method and the coding rate of the signal to be transmitted to the receiving side.

An object of the present invention is to provide a wireless communication terminal and a communication method capable of accurately measuring the channel quality of the own cell in a condition where there is no interference from a neighbor cell.

Solution to Problem

A wireless communication terminal according to an aspect of the invention is a wireless communication terminal to be connected to a base station for transmitting and receiving data to and from the base station, the wireless communication terminal including: a receiver that is configured to receive a signal which includes control information provided for measuring a channel quality of own cell from the base station; an extractor that is configured to extract the control information from the signal received by the receiver; a measurement section that is configured, on the basis of the control information, to measure the channel quality of the own cell in a domain where a neighbor cell does not transmit a signal; and a transmitter that is configured to transmit a measurement result of the channel quality of the own cell measured by the measurement section, to the base station.

In the wireless communication terminal, the measurement section is configured, on the basis of the control information, to measure the channel quality of the own cell in a domain where a relay node indicating the neighbor cell does not transmit a signal.

In the wireless communication terminal, the measurement section is configured, on the basis of the control information, to measure the channel quality of the own cell in an MBSFN subframe that the relay node indicating the neighbor cell uses as a backhaul.

In the wireless communication terminal, the measurement section is configured, on the basis of the control information, to measure the channel quality of the own cell in a domain of the third and subsequent symbols except for the first two symbols in the MBSFN subframe that the relay node indicating the neighbor cell uses as a backhaul.

In the wireless communication terminal, the measurement section is configured, on the basis of the control information, to measure a plurality of channel qualities of the own cell in a domain where the neighbor cell does not transmit a signal, and to average the plurality of channel qualities.

The wireless communication terminal further includes a detector that is configured to detect the highest-quality channel quality of the own cell among the channel qualities of the own cell measured by the measurement section.

In the wireless communication terminal, the measurement section is configured, on the basis of the control information, to measure channel qualities of the own cell in a domain of the third and subsequent symbols except for the first two symbols in an MBSFN subframe that a plurality of relay nodes indicating the neighbor cells use as a backhaul, and the detector is configured to detect the highest-quality channel quality of the own cell among the channel qualities of the own cell measured by the measurement section.

Advantageous Effects of Invention

According to the wireless communication terminal and the communication method in accordance with aspects of the present invention, the channel quality of the own cell under a condition where there is no interference from a neighbor cell can be accurately measured.

MODE FOR CARRYING OUT INVENTION

Figure 1:
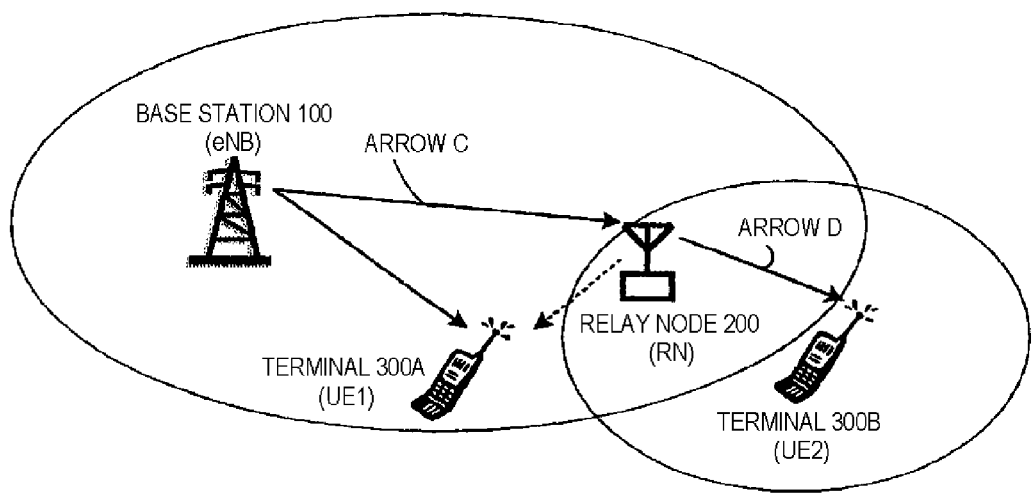
FIG. 1 is a diagram showing a wireless communication system that relays radio signals by using the relay technology in an embodiment of the present invention.

FIG. 1 is a diagram showing a wireless communication system that relays radio signals by using the relay technology in an embodiment of the present invention. In the present embodiment, in FIG. 1, eNB represents a base station 100, RN represents a relay node 200, UE1 represent a wireless communication terminal 300A, and UE2 represents a wireless communication terminal 300B. The wireless communication terminal 300A (UE1) is a wireless communication terminal connected to the base station 100, and the wireless communication terminal 300B (UE2) is a wireless communication terminal connected to the relay node 200 (RN). The wireless communication terminal 300A (UE1) is a wireless communication terminal (UE) under the control of the base station 100. The relay node 200 (RN) is a relay node connected to the base station 100.

Here, it is assumed that the relay node 200 (RN) has an individual cell ID being studied in LTE-A. Therefore, the relay node 200 (RN) adjacent to the wireless communication terminal 300A can be regarded as a neighbor cell when viewed from the wireless communication terminal 300A.

Hereinafter, for purposes of explanation, the base station 100 will be referred to as eNB; the relay node 200, as RN; the wireless communication terminal 300A (UE1), as UE1; and the wireless communication terminal 300B, as UE2.

Moreover, hereinafter, in the present embodiment, a case will be described where radio signals are relayed as shown in FIG. 1. That is, RN receives signals from eNB on the backhaul channel (the arrow C in the figure), and transmits signals to UE2 on the access channel of RN (the arrow D in the figure). The relay method is such that the backhaul channel and the access channel are allocated in the same frequency bandwidth and the backhaul channel and the access channel of RN are allocated while being divided by the time domain (in units of subframes).

Figure 2:
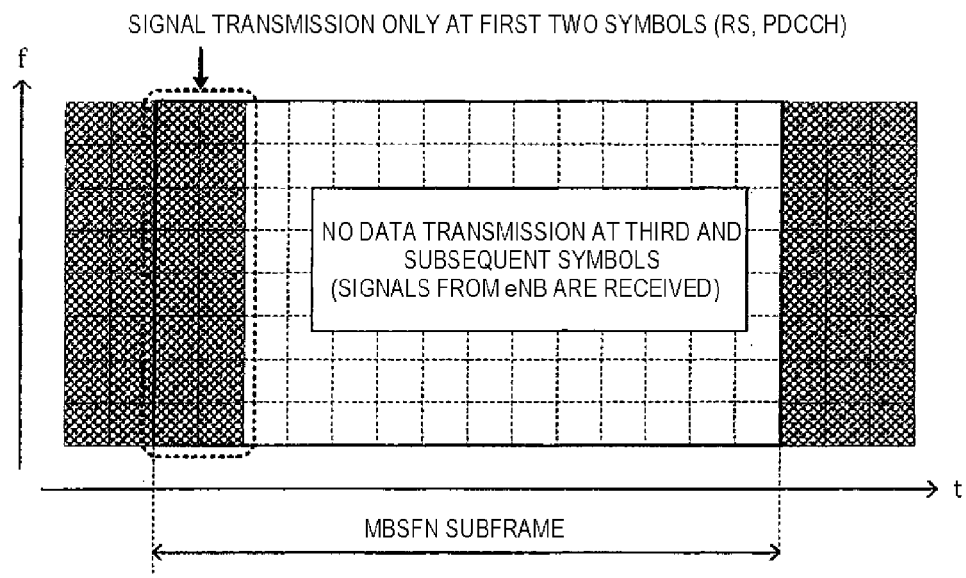
FIG. 2 is a diagram showing an "MBSFN subframe that RN uses as the backhaul" in the present embodiment.
Figure 3:
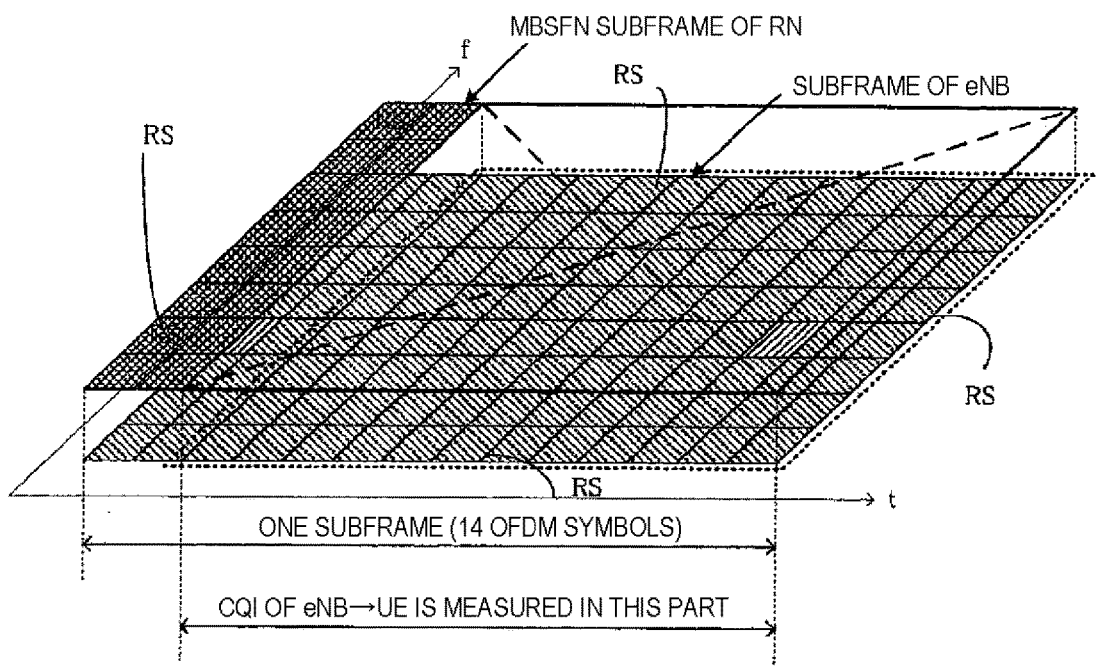
FIG. 3 is a diagram showing a subframe where UE under the control of eNB measures the CQI in the present embodiment.
Figure 4:
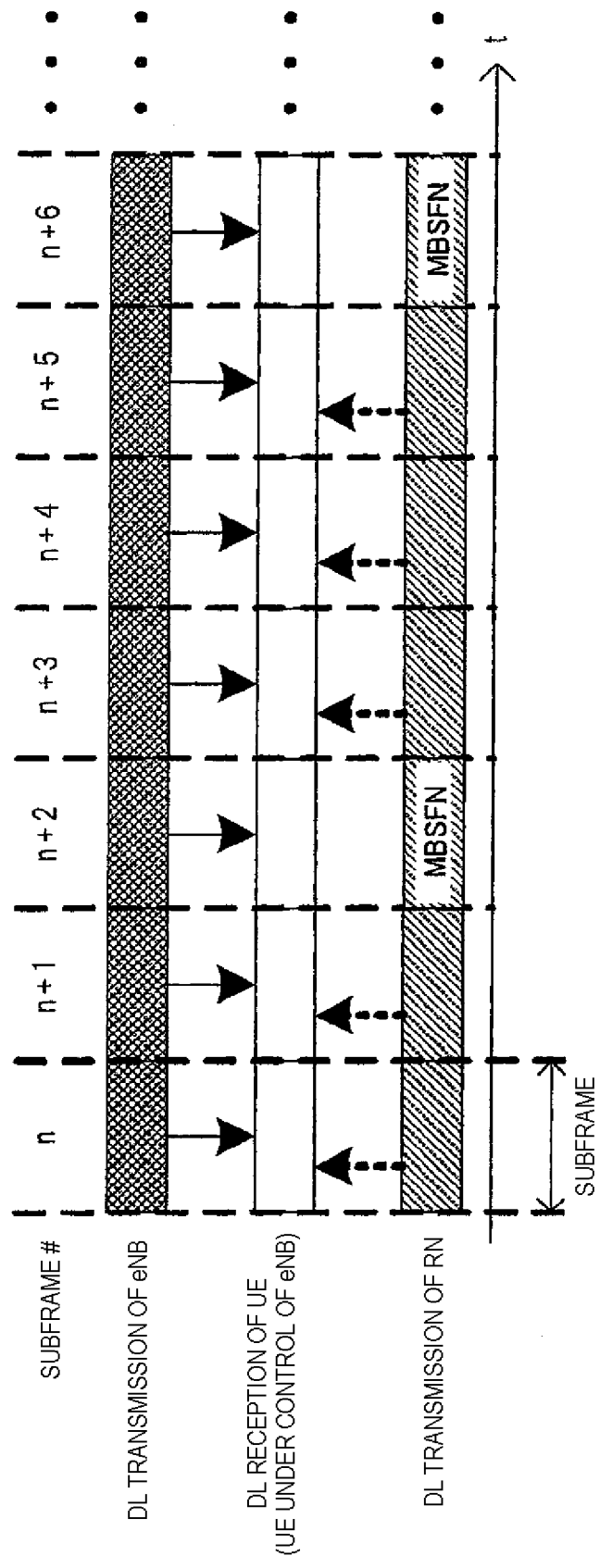
FIG. 4 is a diagram showing an example of subframes on the downlink channel in the present embodiment.

Referring to FIGS. 2 to 4, a method for UE1 under the control of eNB to measure the CQI related to the channel (the channel of the own cell) from eNB to UE1 when there is no interference from RN in the embodiment of the present invention will be described. Specifically, UE1 under the control of eNB measures the CQI related to the channel (the channel of the own cell) from eNB to UE1 by using a signal in a predetermined domain in the "MBSFN subframe that RN uses as the backhaul".

Here, in the present embodiment, the "MBSFN subframe that RN uses as the backhaul" means an MBSFN subframe where in the RN cell, the control information specific to the RN cell is transmitted at the first two symbols of the MBSFN subframe and signals from eNB are received without the data for the MBMS being transmitted in the domains of the third and subsequent symbols.

First, at UE1 under the control of eNB, the amount of interference with the signals transmitted from eNB changes according to the presence or absence of signals from RN. For this reason, the reception SIR of the signals transmitted from eNB improves in the domains where no signal is transmitted from RN. When the "MBSFN subframe that RN uses as the backhaul" is used, from the viewpoint of the subframe and from the viewpoint of the symbol, the domains where no signal is transmitted from RN can be identified.

First, from the viewpoint of the subframe, a reason will be described why UE1 under the control of eNB can identify the domains where no signal is transmitted from RN, by the "MBSFN subframe that RN uses as the backhaul".

When the "MBSFN subframe that RN uses as the backhaul" is used, the amount of interference changes in units of subframes. In LTE, the MBSFN subframe is allocated to a predetermined position, and can be individually set for each cell. The position of allocation of the MBSFN subframe, which is notified to UE by eNB or RN as system information in the SIB2 (System Information Block 2), is not instantaneously changed unlike the user allocation but is changed with a comparatively long period. For this reason, even when RN uses the MBSFN subframe as the backhaul, the position of the MBSFN subframe is individually set for each cell (RN). That is, if the MBSFN subframe used as the backhaul of the neighbor RN is identified, even UE1 under the control of eNB can identify that the subframe is a subframe where there is little interference from RN.

Next, referring to FIG. 2, from the viewpoint of the symbol, a reason will be described why UE1 under the control of eNB can identify the domains where no signal is transmitted from RN, by the "MBSFN subframe that RN uses as the backhaul". FIG. 2 is a diagram showing the "MBSFN subframe that RN uses as the backhaul".

As shown in FIG. 2, in the "MBSFN subframe that RN uses as the backhaul", at the first two symbols, RN transmits signals such as cell-specific control information, and at the third and subsequent symbols, RN makes switching from transmission to reception and receives signals from eNB.

When viewed from UE1 under the control of eNB, in the MBSFN subframe shown in FIG. 2, although the first two symbols appear to be interference, there is no interference in the domains of the third and subsequent symbols. That is, the amount of interference changes between in the domains of the first two symbols and in the domains of the third and subsequent symbols. Therefore, if the "MBSFN subframe that RN uses as the backhaul" is identified with respect to the neighbor RN, even UE1 under the control of eNB can identify a symbol where there is little interference from RN in the MBSFN subframe.

Moreover, since LTE is based on the premise that neighbor cells are not synchronized with each other, there are cases where the timing of subframes is off between neighbor cells. For this reason, even if there is a subframe not performing transmission in the neighbor cell, it appears to be a part with interference and a part without interference for the subframe of the own cell. Moreover, to identify the symbol positions of the signals of the neighbor cell, it is necessary to take subframe synchronization with the neighbor cell. However, between eNB and RN connected to eNB, it is necessary that the subframe of the backhaul transmitted from eNB and the "MBSFN subframe that RN uses as the backhaul" be synchronized with each other. Therefore, between eNB and RN connected to eNB, it is necessary that the subframe of the backhaul transmitted from eNB and the "MBSFN subframe that RN uses as the backhaul" be synchronized with each other at least in units of subframes.

Therefore, even if RN connected to eNB is a neighbor cell, UE1 connected to eNB can be said to be substantially in synchronism in units of subframes although there is a delay time to the extent of approximately a propagation delay time. Consequently, the subframe of eNB which is the "MBSFN subframe that RN uses as the backhaul" is an MBSFN subframe that RN uses as the backhaul over the entire subframe.

From the above-mentioned two viewpoints, in the present embodiment, eNB notifies UE1 under its own control of the position of the "MBSFN subframe that RN uses as the backhaul", and in the "MBSFN subframe that RN uses as the backhaul", UE1 under the control of eNB measures the CQI related to the channel (the channel of the own cell) from eNB to UE1 by using the signals in the domains of the third and subsequent symbols.

First, eNB notifies UE1 under its own control of the position of the "MBSFN subframe that RN uses as the backhaul" at RN connected to eNB. The notification method includes a method in which notification is provided by using system information (system information block), control information in a higher-level layer or the like.

Next, referring to FIG. 3, a subframe will be described where UE1 under the control of eNB measures the CQI related to the channel (the channel of the own cell) from eNB to UE1. FIG. 3 is a diagram showing the subframe where UE1 under the control of eNB measures the CQI related to the channel (the channel of the own cell) from eNB to UE1 in the present invention.

As shown in FIG. 3, UE1 under the control of eNB is provided with a CQI measurement mode in which the CQI related to the channel (the channel of the own cell) from eNB to UE1 is measured by using the domains of the third and subsequent symbols except for the first two symbols in the subframe shown in FIG. 3. In the subframe which is the "MBSFN subframe that RN uses as the backhaul", UE1 under the control of eNB measures the CQI related to the channel (the channel of the own cell) from eNB to UE in the CQI measurement mode described with reference to FIG. 3.

Then, as shown in FIG. 4, of the subframes on the downlink channel in the present embodiment, in the subframes [n+2, n+6] which are the "MBSFN subframes that RN uses as the backhaul", UE1 under the control of eNB measures the CQI related to the channel (the channel of the own cell) from eNB to UE in the above-described CQI measurement mode.

As described with reference to FIGS. 1 to 4, in the present embodiment, eNB notifies UE1 under its own control of the position of the "MBSFN subframe that RN uses as the backhaul", and in the "MBSFN subframe that RN uses as the backhaul", UE1 under the control of eNB measures the CQI related to the channel (the channel of the own cell) from eNB to UE by using the signals in the domains of the third and subsequent symbols, whereby the CQI when there is no interference from RN can be accurately measured.

Figure 6:
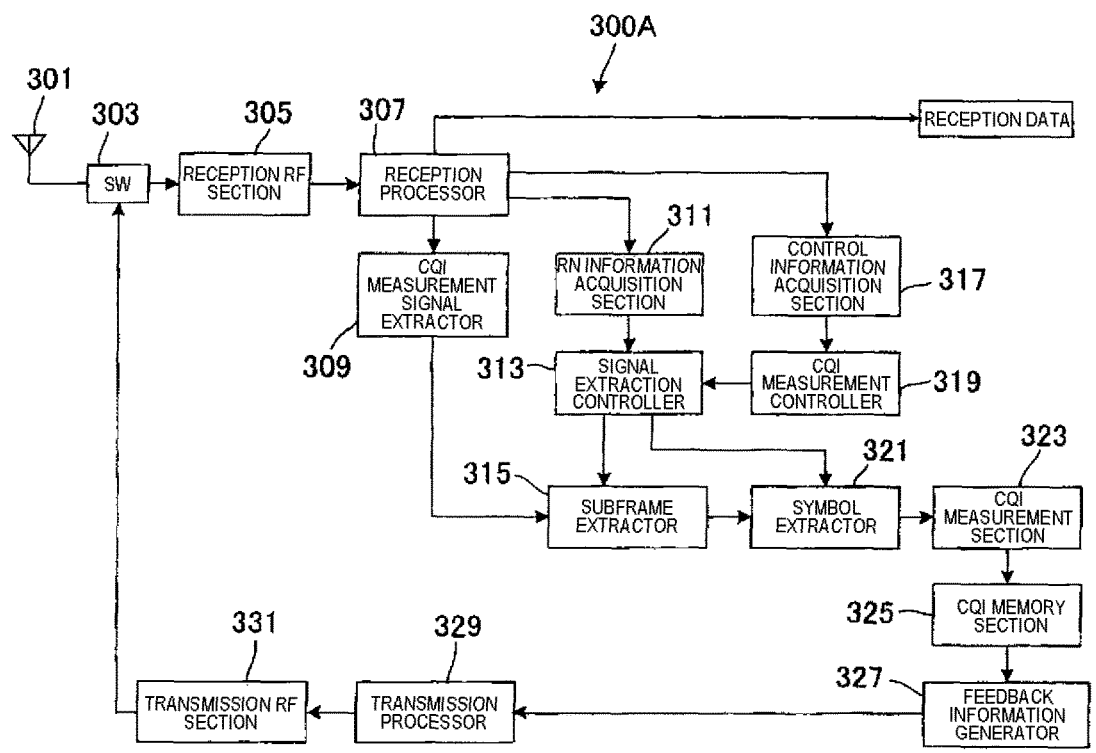
FIG. 6 is a block diagram showing the configuration of a wireless communication terminal 300A according to the present embodiment.

Next, referring to FIG. 6, the configuration of the wireless communication terminal 300A which is UE1 under the control of eNB will be described. FIG. 6 is a block diagram showing the configuration of the wireless communication terminal 300A according to the present embodiment. The wireless communication terminal 300A shown in FIG. 6 includes an antenna 301, a switch (SW) 303, a reception RF section 305, a reception processor 307, a CQI measurement signal extractor 309, a control information acquisition section 317, a CQI measurement controller 319, an RN information acquisition section 311, a signal extraction controller 313, a subframe extractor 315, a symbol extractor 321, a CQI measurement section 323, a CQI memory section 325, a feedback information generator 327, a transmission processor 329, and a transmission RF section 331.

On the signals received by the antenna 301, the reception RF section 305 performs filtering processing in order to remove the signals except for the communication bandwidth, performs frequency conversion to the IF frequency bandwidth or to the baseband width, and outputs the resultant signals to the reception processor 307.

The reception processor 307 performs reception processing on the signals outputted from the reception RF section 305. The reception processor 307 separates the data, the reference signal, the control information and the information related to RN that are multiplexed on the received signals, and outputs them. Specifically, the reception processor 307 converts the analog signals to digital signals by an AD converter or the like, and performs demodulation processing, decoding processing and the like.

The CQI measurement signal extractor 309 extracts the signal used for the CQI measurement in the received signals which signal is separated by the reception processor 307, and outputs it to the subframe extractor 315. The signal used for the CQI measurement is, for example, a reference signal when a desired signal component is measured. Moreover, the signal used for the CQI measurement is, for example, a data signal when an interference component is measured.

The control information acquisition section 317 acquires, of the control information separated by the reception processor 307, the control information for the wireless communication terminal 300A, and outputs the control information related to the CQI measurement for the wireless communication terminal 300A, to the CQI measurement controller 319.

The CQI measurement controller 319 outputs an instruction to the signal extraction controller 313 so that the CQI measurement method is controlled based on the control information related to the CQI measurement for the wireless communication terminal 300A which information is outputted from the control information acquisition section 317. The CQI measurement methods that the CQI measurement controller 319 controls are the CQI measurement method used for the "MBSFN subframe that RN uses as the backhaul" which measurement method has been described with reference to FIGS. 3 and 4 and a normal CQI measurement method. The CQI measurement controller 319 determines which of the CQI measurement methods is used based on the control information related to the CQI measurement outputted from the control information acquisition section 317, and provides an instruction as to the result of the determination to the signal extraction controller 313.

The RN information acquisition section 311 acquires the information related to RN separated by the reception processor 307, and outputs it to the signal extraction controller 313. The information related to RN includes the position of the "MBSFN subframe that RN uses as the backhaul". Here, the information related to RN is information related to RN connected to eNB.

Based on the instruction from the CQI measurement controller 319, the signal extraction controller 313 outputs an instruction to the subframe extractor 315 and the symbol extractor 321 by using the information related to RN outputted from the RN information acquisition section 311. When instructed by the CQI measurement controller 319 to measure the CQI related to the channel (the channel of the own cell) from eNB to UE by the CQI measurement method for the "MBSFN subframe that RN uses as the backhaul", the signal extraction controller 313 instructs the subframe extractor 315 to extract the "MBSFN subframe that RN uses as the backhaul" outputted from the RN information acquisition section 311, and further, instructs the symbol extractor 321 to extract the domains of the third and subsequent symbols except for the first two symbols in the "MBSFN subframe that RN uses as the backhaul". Moreover, when instructed by the CQI measurement controller 319 to perform the normal CQI measurement method, the signal extraction controller 313 instructs the subframe extractor 315 to output all the subframes, and instructs the symbol extractor 321 to extract the domains of all the symbols.

Based on the instruction from the signal extraction controller 313, the subframe extractor 315 extracts the signal used for the CQI measurement extracted by the CQI measurement signal extractor 309, in units of subframes, and outputs it to the symbol extractor 321.

The subframe extractor 315 may have the function of buffering the signal used for the CQI measurement extracted by the CQI measurement signal extractor 309. Moreover, the subframe extractor 315 may extract the signal in units of subframes from the buffered signal based on the instruction from the signal extraction controller 313 and output it.

Based on the instruction from the signal extraction controller 313, the symbol extractor 321 extracts, in the symbol domain, the signal used for the CQI measurement in units of subframes extracted by the subframe extractor 315, and outputs it to the CQI measurement section 323.

The CQI measurement section 323 performs the measurement of the CQI related to the channel (the channel of the own cell) from eNB to UE by using the signal used for the CQI measurement extracted by the symbol extractor 321, and outputs the measured CQI to the CQI memory section 325. For example, when a desired signal component is measured, to the CQI measurement section 323, a method is available in which channel estimation is performed by using the reference signal of the received signal and the received power of the desired signal component is measured from the result of the channel estimation. Moreover, when an interference component is measured, to the CQI measurement section 323, a method is available in which the received power is measured by using the data area and the received power of the desired data is subtracted to thereby measure the receiver power of the interference component. In the latter case, a method is available in which the received power of the desired data is acquired from the received power of the desired signal component described previously.

The CQI memory section 325 stores the CQI measured by the CQI measurement section 323 therein, and outputs it to the feedback information generator 327.

The feedback information generator 327 generates information to be fed back to the base station 100 by using the CQI stored in the CQI memory section 325, and outputs it to the transmission processor 329.

The transmission processor 329 performs transmission processing on the feedback information generated by the feedback information generator 327 so that it can be fed back to the base station 100, and outputs the information to the transmission RF section 331. Examples of the transmission processing include multiplexing of signals such as transmission data and feedback information, coding processing and modulation processing.

The transmission RF section 331 performs frequency conversion to the RF frequency, power amplification and transmission filtering processing on the transmission signal having undergone the transmission processing by the transmission processor 329, and outputs the signal to the antenna 301.

Figure 7:
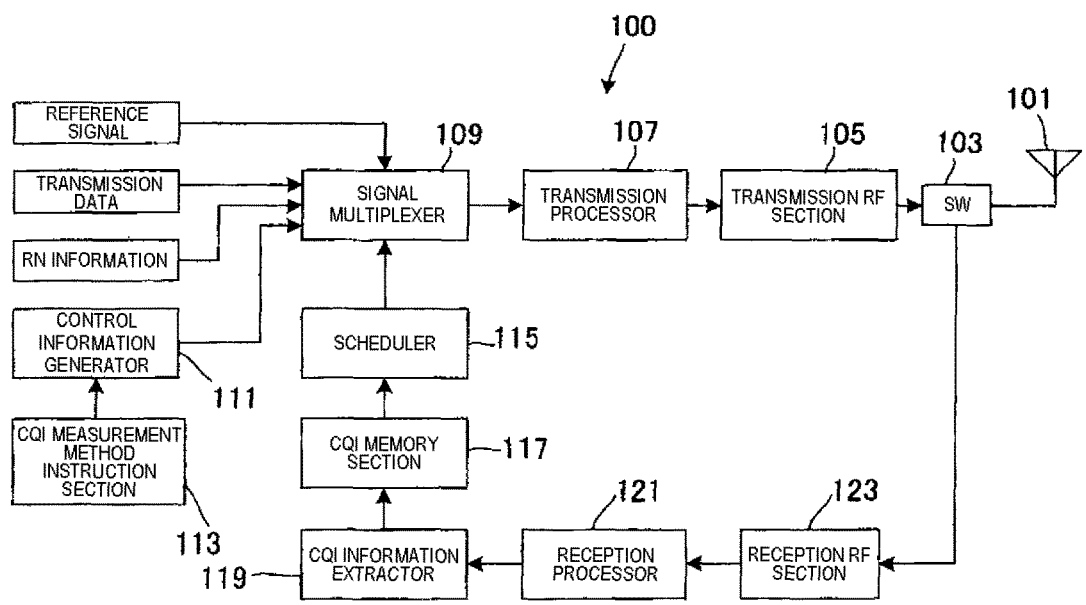
FIG. 7 is a block diagram showing the configuration of a base station 100 according to the present embodiment.

Next, referring to FIG. 7, the configuration of the base station 100 will be described. FIG. 7 is a block diagram showing the configuration of the base station 100 according to the present embodiment. The base station 100 shown in FIG. 7 includes a CQI measurement method instruction section 113, a control information generator 111, a signal multiplexer 109, a transmission processor 107, a transmission RF section 105, a reception RF section 123, a reception processor 121, a CQI information extractor 119, a CQI memory section 117, and a scheduler 115. Moreover, inputted to the signal multiplexer 109 are the reference signal, transmission data and RN information. The reference signal is constituted by a known signal between transmission and reception, and is inputted to the signal multiplexer 109. The reference signal is used, for example, for the estimation of the channel for demodulation on the receiving side and the CQI measurement. The transmission data is transmission data to the wireless communication terminals 300A and 300B, and is inputted to the signal multiplexer 109. The RN information is information related to the relay node (RN) connected to the base station 100, and is inputted to the signal multiplexer 109.

The CQI measurement method instruction section 113 outputs, to the control information generator 111, an instruction to control the CQI measurement used in the wireless communication terminal 300A.

The CQI measurement method instruction section 113 may be provided in the wireless communication terminal 300A. When the wireless communication terminal 300A is provided with the CQI measurement method instruction section 113, the wireless communication terminal 300A may determine whether the subframe is the "MBSFN subframe that RN uses as the backhaul" or not and control the CQI measurement method. Moreover, when the wireless communication terminal 300A always performs both the CQI measurement in the "MBSFN subframe that RN uses as the backhaul" and the CQI measurement in the normal subframe and reports the result, the CQI measurement method instruction section 113 is unnecessary.

The control information generator 111 generates control information related to the wireless communication terminal 300A including the instruction to control the CQI measurement outputted from the CQI measurement method instruction section 113, and outputs it to the signal multiplexer 109.

The signal multiplexer 109 multiplexes the inputted reference signal, transmission data to the wireless communication terminals, RN information and control information, and outputs the result to the transmission processor 107. Based on the scheduling information outputted from the scheduler 115 described later, the signal multiplexer 109 allocates the transmission data to the wireless communication terminals 300A and 300B, performs user multiplexing, and performs multiplexing with other signals.

The transmission processor 107 performs transmission processing on the signal multiplexed by the signal multiplexer 109, and outputs the signal to the transmission RF section 105. Examples of the transmission processing include coding processing and modulation processing.

The transmission RF section 105 performs frequency conversion to the RF frequency, power amplification and transmission filtering processing on the transmission signal having undergone the transmission processing by the transmission processor 107, and outputs the signal to an antenna 101.

On the signals received by the antenna, the reception RF section 123 performs filtering processing in order to remove the signals except for the communication bandwidth, performs frequency conversion to the IF frequency bandwidth or to the baseband width, and outputs the resultant signal to the reception processor 121.

The reception processor 121 performs reception processing on the signals outputted from the reception RF section 123, and separates the reception data, the control information and the like. Specifically, the reception processor 121 converts the analog signals to digital signals by an AD converter or the like, and performs demodulation processing, decoding processing and the like.

The CQI information extractor 119 extracts CQI information from the control information separated by the reception processor 121, and outputs it to the CQI memory section 117.

The CQI memory section 117 stores the CQI information extracted by the CQI information extractor 119, and outputs it to the scheduler 115.

Figure 8:
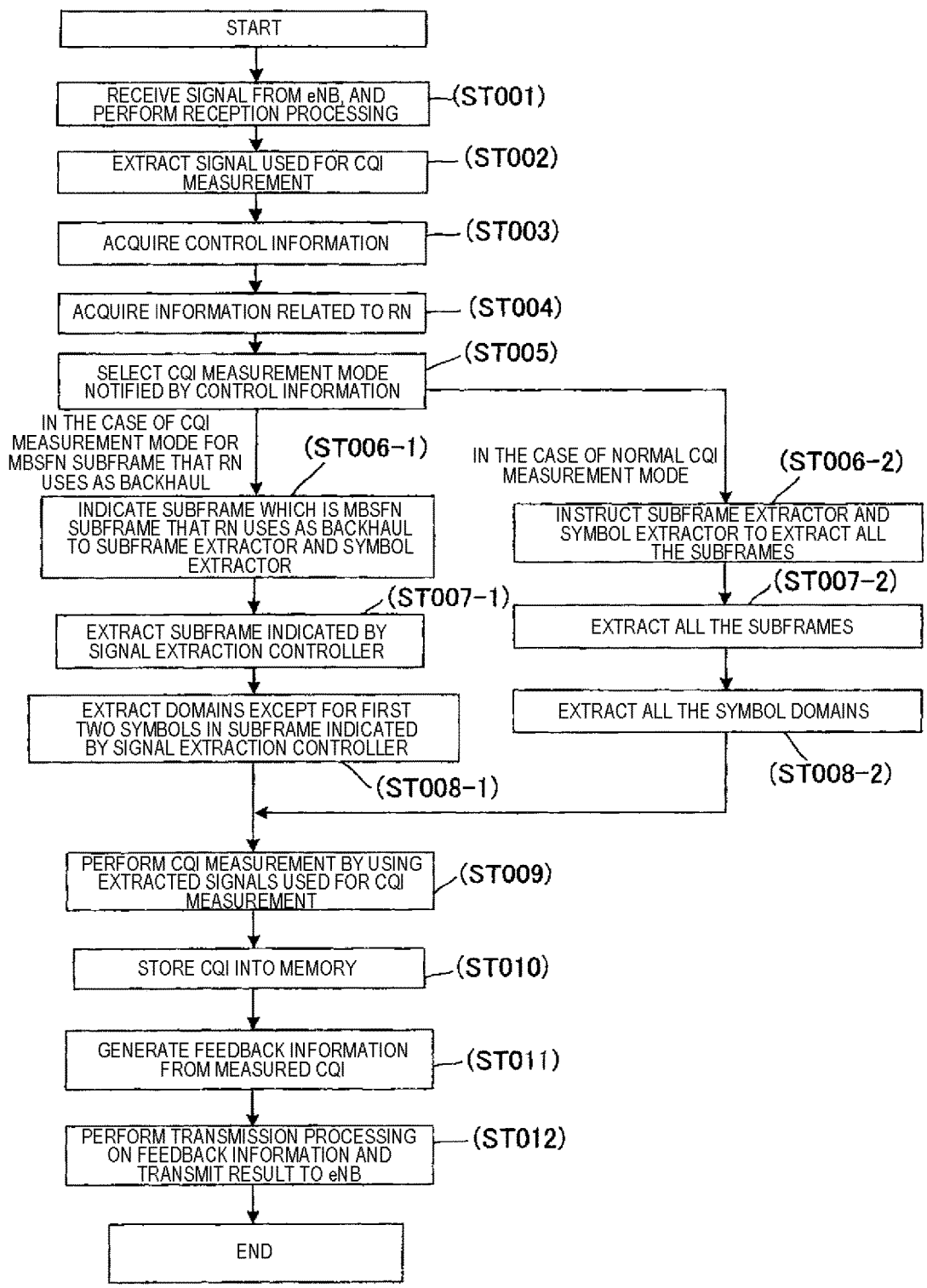
FIG. 8 is a processing flow chart of the CQI measurement at the wireless communication terminal 300A according to the present invention.

The scheduler 115 performs scheduling by using the CQI information stored in the CQI memory section 117, and outputs scheduling information to the signal multiplexer 109. In the scheduling, the scheduler 115 determines the transmission subframe and the transmission frequency (resource block) by using the CQI information Next, referring to FIG. 8, the processing flow of the CQI measurement at the wireless communication terminal 300A according to the present embodiment will be described. FIG. 8 is a diagram showing the processing flow of the CQI measurement at the wireless communication terminal 300A.

At step (ST001), the antenna 301 receives a signal from eNB, and the reception RF section 305 and the reception processor 307 perform reception processing.

At step (ST002), the CQI measurement signal extractor 309 extracts the signal used for the CQI measurement from the signal having undergone the reception processing at step (ST001).

At step (ST003), the control information acquisition section 317 acquires the control information for the UE1 under the control of eNB, from the signal having undergone the reception processing at step (ST001).

At step (ST004), the RN information acquisition section 311 acquires the information related to RN, from the signal having undergone the reception processing at step (ST001).

At step (ST005), the CQI measurement controller 319 selects in which of the CQI measurement mode for the "MBSFN subframe that RN uses as the backhaul" and the normal CQI measurement mode the CQI is measured, from the control information acquired at step (ST003).

<In the Case of the CQI Measurement Mode for the "MBSFN Subframe that RN Uses as the Backhaul">

At step (ST006-1), the signal extraction controller 313 indicates, to the subframe extractor 315 and the symbol extractor 321, the subframe which is the "MBSFN subframe that RN uses as the backhaul" from the information related to RN acquired at step (ST004).

At step (ST007-1), the subframe extractor 315 extracts the subframe which is the "MBSFN subframe that RN uses as the backhaul" from the signal used for the CQI measurement extracted at step (ST002) in the subframe which is the "MBSFN subframe that RN uses as the backhaul" indicated by the signal extraction controller 313 at step (ST006-1).

At step (ST008-1), the symbol extractor 321 extracts the signals of the domains except for the first two symbols, from the signal of the subframe extracted at step (ST007-1) in the subframe which is the "MBSFN subframe that RN uses as the backhaul" notified by the signal extraction controller 313 at step (ST006-1).

<In the Case of the Normal CQI Measurement Mode>

At step (ST006-2), the signal extraction controller 313 instructs the subframe extractor 315 and the symbol extractor 321 to perform signal extraction in all the subframes.

At step (ST007-2), the subframe extractor 315 extracts all the subframes of the signal used for the CQI measurement extracted at step (ST002) as instructed by the signal extraction controller 313 at step (ST006-2).

At step (ST008-2), the symbol extractor 321 extracts the signals of all the symbol domains in the signals of all the subframes extracted at step (ST007-2) as instructed by the signal extraction controller 313 at step (ST006-2).

At step (ST009), the CQI measurement section 323 performs the CQI measurement by using the signals extracted at step (ST008-1) or (ST008-2).

At step (ST010), the CQI memory section 325 stores the CQI measured at (ST009).

At step (ST011), the feedback information generator 327 generates the feedback information from the CQI stored at step (ST010).

At step (ST012), the transmission processor 329 and the transmission RF section 331 perform the transmission processing on the feedback information generated at step (ST011), and transmits the result to eNB.

While in the present embodiment, UE1 under the control of eNB measures the CQI by using the domains of the third and subsequent symbols except for the first two symbols in the subframe which is the "MBSFN subframe that RN uses as the backhaul", the present invention is not limited to this subframe. For example, in all the subframes, as in the present embodiment, UE1 under the control of eNB may measure the CQI related to the channel (the channel of the own cell) from eNB to UE1 by using the domains of the third and subsequent symbols except for the first two symbols. Thereby, although the CQI accuracy is slightly degraded since the first two symbols cannot be used for the CQI measurement in the subframes that RN does not use as the backhaul, the overhead of signaling can be reduced since it is unnecessary for eNB to notify the information related to the MBSFN subframe used as the backhaul of the neighbor RN, and the like.

In the present embodiment, in the "MBSFN subframe that RN uses as the backhaul", in the subframe of eNB, the transmission power of the reference signal may be increased. In the CQI measurement mode of UE1 under the control of eNB in the present embodiment, since the first two symbols cannot be used for the CQI measurement, by increasing the power accordingly, the CQI measurement accuracy can be maintained. In this case, eNB notifies UE1 under the control of eNB how much the transmission power has been increased. Moreover, for the CQI measurement, the reference signal may be inserted in part of the data domains of the third and subsequent symbols. Since the first two symbols cannot be used for the CQI measurement, by inserting the reference signal corresponding thereto, the CQI measurement accuracy can be maintained. In this case, eNB notifies UE1 under the control of eNB that the reference signal has been inserted for the CQI measurement.

In the present embodiment, in the case of a periodic CQI, when the fourth subframe prior to the subframe where the CQI is fed back is not the "MBSFN subframe that RN uses as the backhaul", UE1 under the control of eNB may measure the CQI in the above-described CQI measurement mode in the "MBSFN subframe that RN uses as the backhaul" which is prior to the fourth subframe and is the closest.

Figure 5:
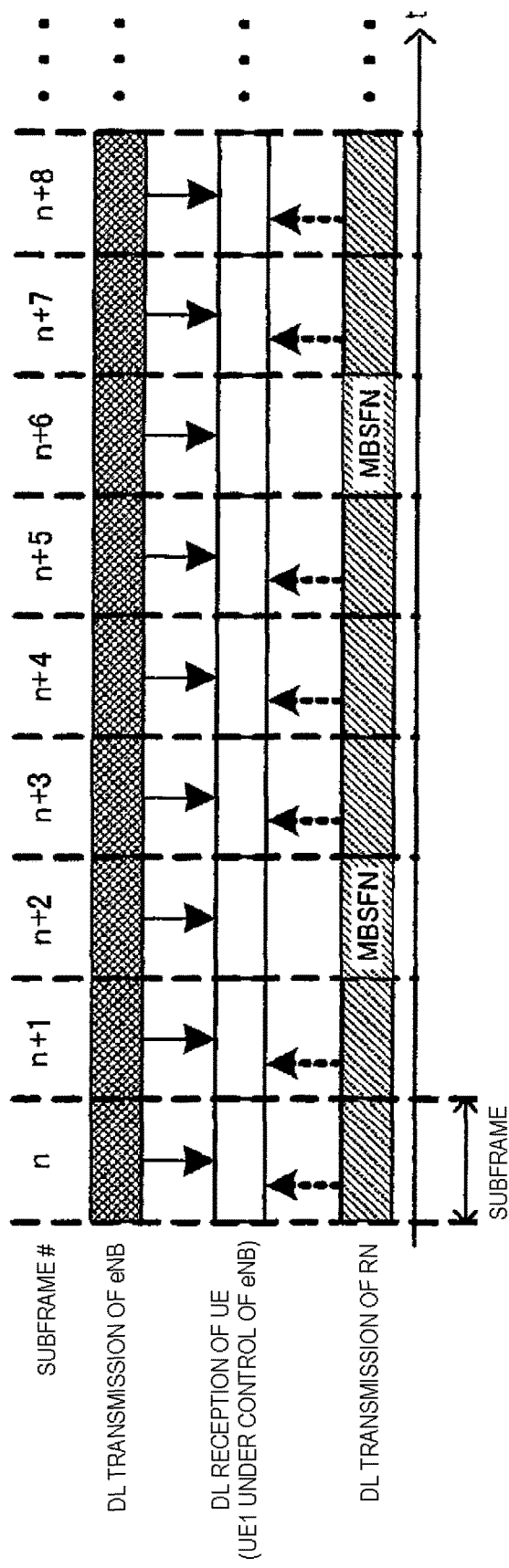
FIG. 5 is a diagram showing another example of subframes on the downlink channel in the present embodiment.

Referring to FIG. 5, an example will be described in which UE1 under the control of eNB measures the CQI related to the channel (the channel of the own cell) from eNB to UE1 in the "MBSFN subframe that RN uses as the backhaul" which is prior to a predetermined number of subframes and is the closest. FIG. 5 is a diagram showing another example of the downlink channel in the present embodiment in the case of the periodic CQI.

As shown in FIG. 5, in the periodic CQI reported on the uplink channel of the subframe [n+8], the CQI measured on the downlink channel of the subframe [n+4] which is the fourth subframe prior to the subframe [n+8] is measured.

However, in this subframe [n+4], since RN is the normal subframe, the CQI cannot be measured in the CQI measurement of the present embodiment. Therefore, in the subframe [n+2] which is the "MBSFN subframe used as the backhaul of RN" that is prior to the subframe [n+4] and the closest to the subframe [n+4], UE1 under the control of eNB may measure the CQI related to the channel (the channel of the own cell) from eNB to UE1 in the above-described CQI measurement mode of the present embodiment and notify eNB of it on the uplink channel of the subframe [n+8].

In the present embodiment, in the case of the aperiodic CQI, in the "MBSFN subframe that RN uses as the backhaul" notified by eNB, when UE1 under the control of eNB is instructed by eNB to measure the CQI, UE1 under the control of eNB may measure the CQI related to the channel (the channel of the own cell) from eNB to UE1 in the CQI measurement mode of the present embodiment. For example, explaining this similarly by using FIG. 5 is as follows:

If eNB has notified UE1 under the control of eNB of the "MBSFN subframe that RN uses as the backhaul", UE1 under the control of eNB knows the position of the subframe which is the "MBSFN subframe used as the backhaul of RN". Therefore, for example, in the subframe [n+2] shown in FIG. 5, when UE1 under the control of eNB is instructed to measure the CQI related to the channel (the channel of the own cell) from eNB to UE1, UE1 under the control of eNB may measure the CQI related to the channel (the channel of the own cell) from eNB to UE1 in the CQI measurement mode of the present embodiment.

In the present embodiment, in the case of the aperiodic CQI, eNB may instructs UE1 under the control of eNB in the PDCCH to perform measurement in the CQI measurement mode for the "MBSFN subframe that RN uses as the backhaul". Specifically, in the format 0 of the PDCCH, a CQI request for the "MBSFN subframe used as the backhaul of RN" is added. Consequently, even if eNB does not notify UE1 under the control of eNB of the information related to the "MBSFN subframe that RN uses as the backhaul" of the neighbor RN, UE1 under the control of eNB can measure the CQI related to the channel (the channel of the own cell) from eNB to UE1 in the CQI measurement mode of the present embodiment.

In the present embodiment, UE1 under the control of eNB may measure, a plurality of number of times, the CQI related to the channel (the channel of the own cell) from eNB to UE1 measured in the "MBSFN subframe that RN uses as the backhaul" and average it. Specifically, the range where the signal component is measured is performed is limited to the "MBSFN subframe that RN uses as the backhaul", and the range where the interference component is measured is performed is limited to the "MBSFN subframe that RN uses as the backhaul". Thereby, the accuracy of measurement of the CQI related to the channel (the channel of the own cell) from eNB to UE1 can be improved.

While eNB and RN connected to the eNB are described in the present embodiment, the present invention may be applied to a case where in a plurality of eNBs, there is a subframe where no signal is transmitted from one eNB.

While the CQI of the channel from eNB to UE is described as the channel quality of the own cell in the present embodiment, the present invention is not limited thereto. For example, the channel quality of the own cell measured when handover is performed may be used.

(First Modification)

Next, referring to FIGS. 9 to 13, a first modification of the present embodiment will be described. While a case where the number of RNs connected to eNB is one is described as an example in the above-described embodiment, in the first modification of the present embodiment, a case where a plurality of RNs are connected to one eNB will be described.

When a plurality of RNs are connected to one eNB, there are cases where the positions of the MBSFN subframes used as the backhaul by the RNs are different. This is attributed to the fact that the numbers of MBSFN subframes used as the backhaul are not the same since the capacity of the backhaul of RN differs among RNs. Moreover, if the backhauls of a plurality of RNs are made the same subframe, traffic is concentrated, sufficient resources cannot be allocated to each RN, and this can degrade efficiency, so that the positions of the MBSFN subframes used as the backhaul at RNs are different.

When the positions of the "MBSFN subframes used as the backhaul at RNs" are different as mentioned above, since the amounts of interferences from RNs are different according to the position of UE under the control of eNB, the amount of interference differs among the subframes. That is, when the position of UE under the control of eNB is close to RN, the interference received from the RN is strong, and when it is far from RN, the interference received from the RN is weak. Consequently, it is preferable for UE under the control of eNB to have signals transmitted from a subframe where the interference is weaker.

Figure 9:
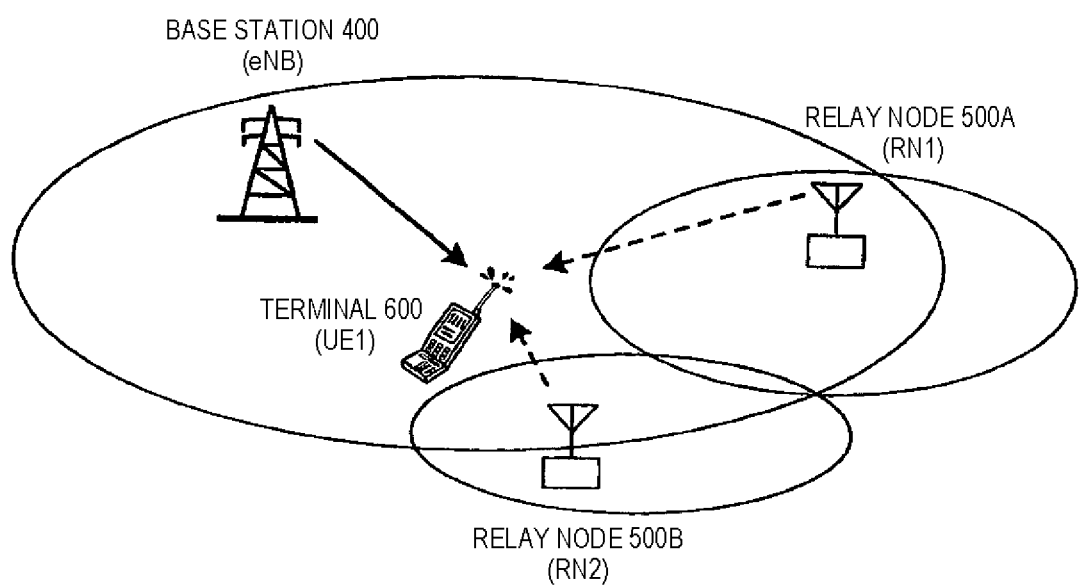
FIG. 9 is a diagram showing a wireless communication system that relays radio signals by using the relay technology in a first modification of the present embodiment.

FIG. 9 is a diagram showing a wireless communication system that relays radio signals by using the relay technology in the first modification of the present embodiment. In the first modification, in FIG. 9, eNB represents a base station 400, RN1 represents a relay node 500A, RN2 represents a relay node 500B, and UE1 represents a wireless communication terminal 600. The wireless communication terminal 600 (UE1) is a wireless communication terminal connected to the base station 400, in other words, a wireless communication terminal under the control of the base station 400. In the first modification, there are two relay nodes that are connected to the same base station.

Here, it is assumed that the positional relationship among the wireless communication terminal 600, the relay node 500A (RN1) and the relay node 500B (RN2) is such that the relay node 500B (RN2) is in a position closer to the wireless communication terminal 600 (UE1) than the relay node 500A (RN1).

Further, in the wireless communication system of the first modification of the present embodiment, the relay method is such that the backhaul channel and the access channel are accommodated in the same frequency bandwidth and the backhaul channel and the access channel of RN are allocated while being divided by the time domain (in units of subframes). Hereinafter, for purposes of explanation, the base station 400 will be referred to as eNB; the relay node 500A, as RN1; the relay node 500B, as RN2; and the wireless communication terminal 600 under the control of the base station 400, as UE1.

Here, it is assumed that the relay node 500A (RN1) and the relay node 500B (RN2) have an individual cell ID studied in LTE-A. Therefore, the relay node 500 (RN1) and the relay node 500B adjacent to the wireless communication terminal 600 can be regarded as neighbor cells when viewed from the wireless communication terminal 600.

Figure 10:
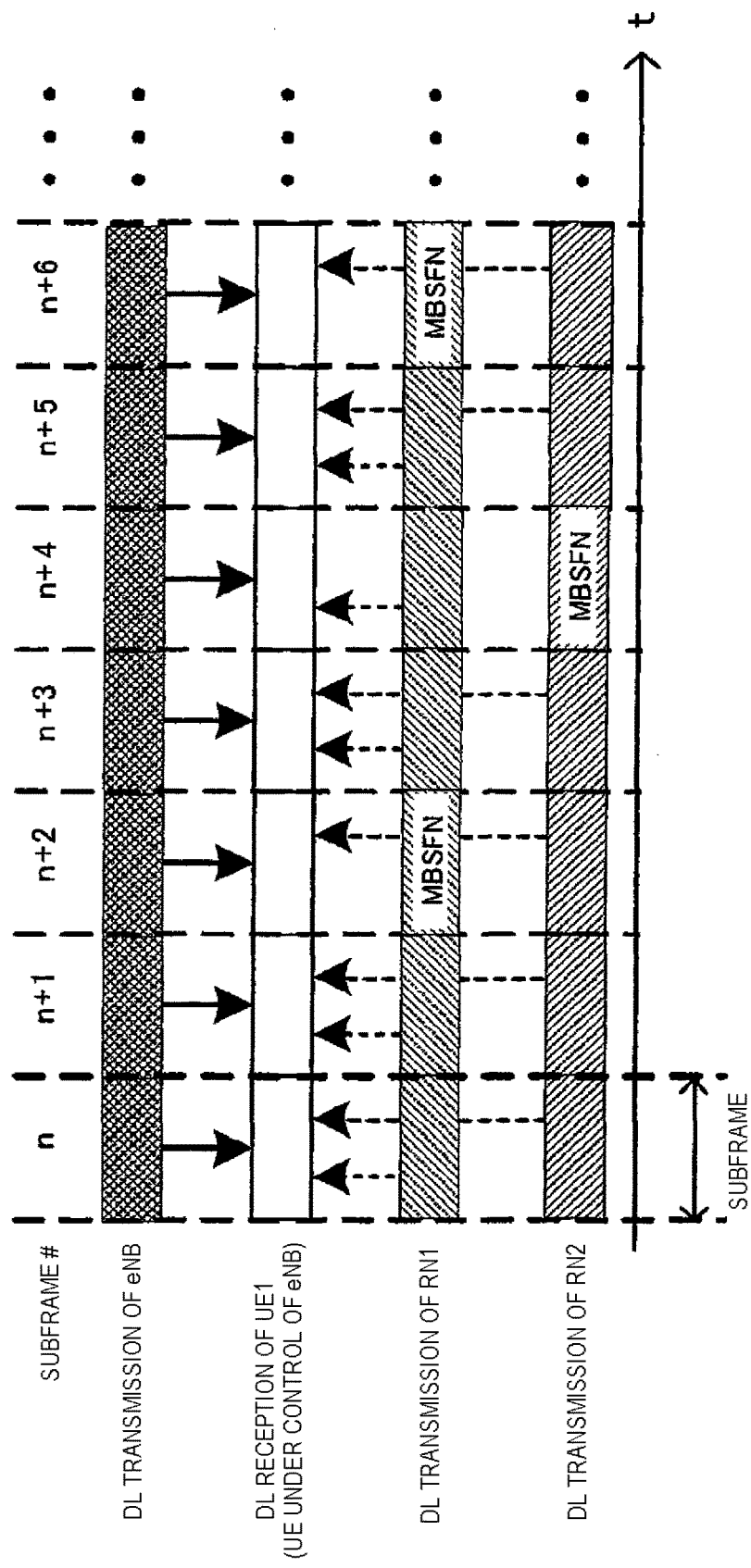
FIG. 10 is a diagram showing the subframes on the downlink channel in the first modification.

Referring to FIG. 10, the subframes on the downlink channel in the wireless communication system shown in FIG. 9 will be described. FIG. 10 is a diagram showing the subframes on the downlink channel in the first modification. In FIG. 10, at RN1, the positions of the "MBSFN subframes that RN uses as the backhaul" are the subframes [n+2] and

[n+6]. On the other hand, at RN2, the position of the "MBSFN subframe that RN uses as the backhaul" is the subframe [n+4].

As shown in FIG. 10, in the subframes [n, n+1, n+3, n+5], UE1 receives interferences from both RN1 and RN2 as shown by the arrows (broken lines). However, although UE1 receives an interference from RN2 and an interference from RN1 in the subframes [n+2, n+6] and the subframe [n+4], the amounts of interferences from the two RN1 and RN2 are different. That is, since RN1 is situated farther from UE1 than RN2, the amount of interference that UE1 receives from RN1 is weaker than the amount of interference that UE1 receives from RN2. Therefore, comparing the amounts of interferences that UE1 receives from RN1 and RN2, the amount of interference that UE1 receives from RN is weaker in the subframe [n+4] where UE1 receives an interference from RN1 than in the subframes [n+2, n+6] where UE1 receives an interference from RN2.

Considering the above-described amounts of interferences from RNs that UE1 receives, in the first modification of the present embodiment, UE1 under the control of eNB is notified of the positions of the MBSFN subframes used as the backhaul at all the RNs under the control of eNB, and UE1 under the control of eNB detects a subframe where the interference is small and feeds back the position of the subframe to eNB together with the CQI related to the channel (the channel of the own cell) from eNB to UE1. Hereinafter, a concrete method of the first modification considering the amounts of interferences from RNs that UE receives will be described.

First, eNB notifies UE1 under its own control of the position of the "MBSFN subframe that RN uses as the backhaul" at all the RNs connected to eNB. The notification method includes a method in which notification is provided by using system information (system information block), control information of a higher-level layer or the like.

Then, as in the present embodiment, UE1 under the control of eNB measures the CQI related to the channel (the channel of the own cell) from eNB to UE1 in the CQI measurement mode described with reference to FIG. 3 in the subframe notified by eNB. Then, UE1 detects a subframe where the CQI is high from among the notified subframes, and feeds back the CQI and the position of the subframe to eNB. For example, explaining the environment assumed in FIGS. 9 and 10, UE1 measures the CQI for the "MBSFN subframe that RN uses as the backhaul" in the subframes [n+2, n+4, n+6], detects the subframe [n+4] where the amount of interference is small from thereamong, and feeds back the CQI in the subframe [n+4] and the subframe number.

As described above, in the first modification of the present embodiment, eNB notifies UE1 under the control of eNB of the position of the "MBSFN subframe that RN uses as the backhaul" at all the RNs under the control of eNB, and UE1 under the control of eNB detects a subframe where the interference is small and feeds back the position of the subframe to eNB together with the CQI related to the channel (the channel of the own cell) from eNB to UE1. Consequently, in the first modification of the present embodiment, at UE1 under the control of eNB, the CQI related to the channel (the channel of the own cell) from eNB to UE1 can be measured in the subframe where the interference from RN is smaller.

Figure 11:
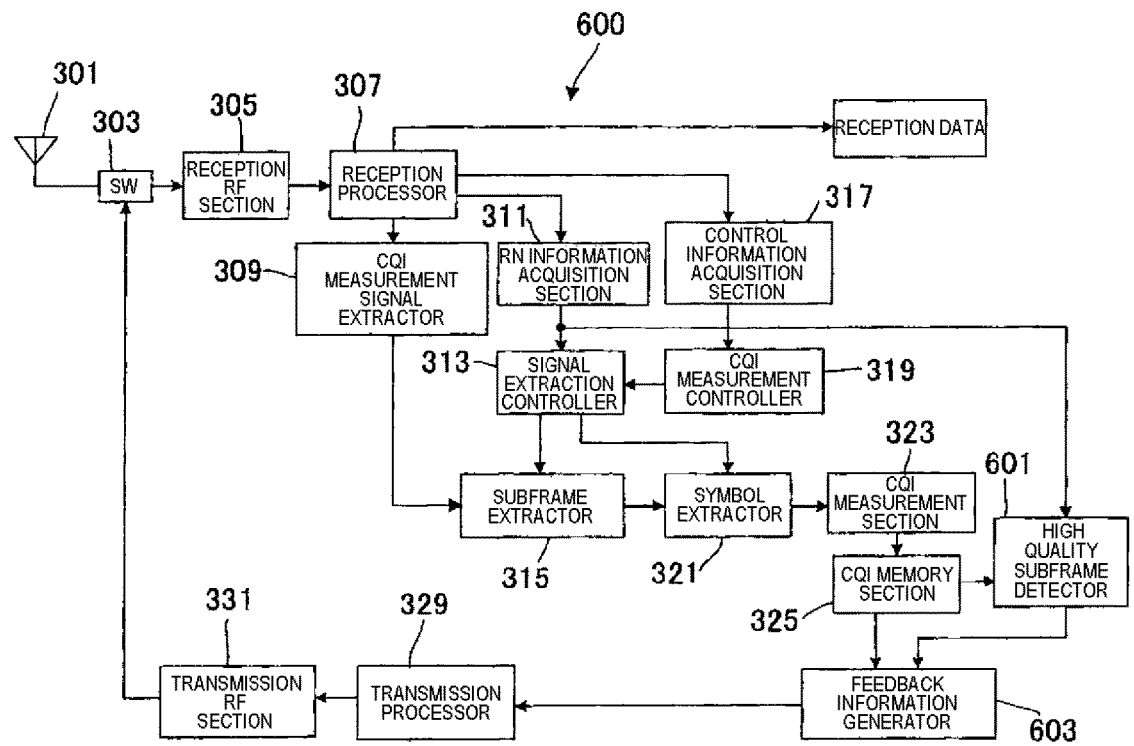
FIG. 11 is a block diagram showing the configuration of a wireless communication terminal 600 in the first modification.

Referring to FIG. 11, the configuration of the wireless communication terminal 600 as UE1 will be described. FIG. 11 is a block diagram showing the configuration of the wireless communication terminal 600 in the first modification. The wireless communication terminal 600 shown in FIG. 11 is different from the wireless communication terminal 300A shown in FIG. 6 in that a high quality subframe detector 601 and a feedback information generator 603 are provided. Except for this, the configuration is similar to that of the embodiment, and in FIG. 11, elements in common with FIG. 6 are denoted by the same reference numerals. Moreover, descriptions of the common elements are omitted.

The high quality subframe detector 601 detects the CQI of the highest quality from among the CQIs stored in the CQI memory section 325. Then, the high quality subframe detector 601 measures the CQI for the "MBSFN subframe that RN uses as the backhaul" by using the information on the position of the "MBSFN subframe that RN uses as the backhaul" acquired by the RN information acquisition section 311, detects the position of the subframe where the CQI is of high quality, and outputs the detection result (the subframe number and the CQI related to the channel [the channel of the own cell] from eNB to UE1 in the subframe) to the feedback information generator 603.

The feedback information generator 603 generates feedback information from the subframe information (subframe number) detected by the high quality subframe detector 601 and the CQI related to the channel (the channel of the own cell) from eNB to UE1 in the subframe stored in the CQI memory section 325, and outputs it to the transmission processor 329.

Figure 12:
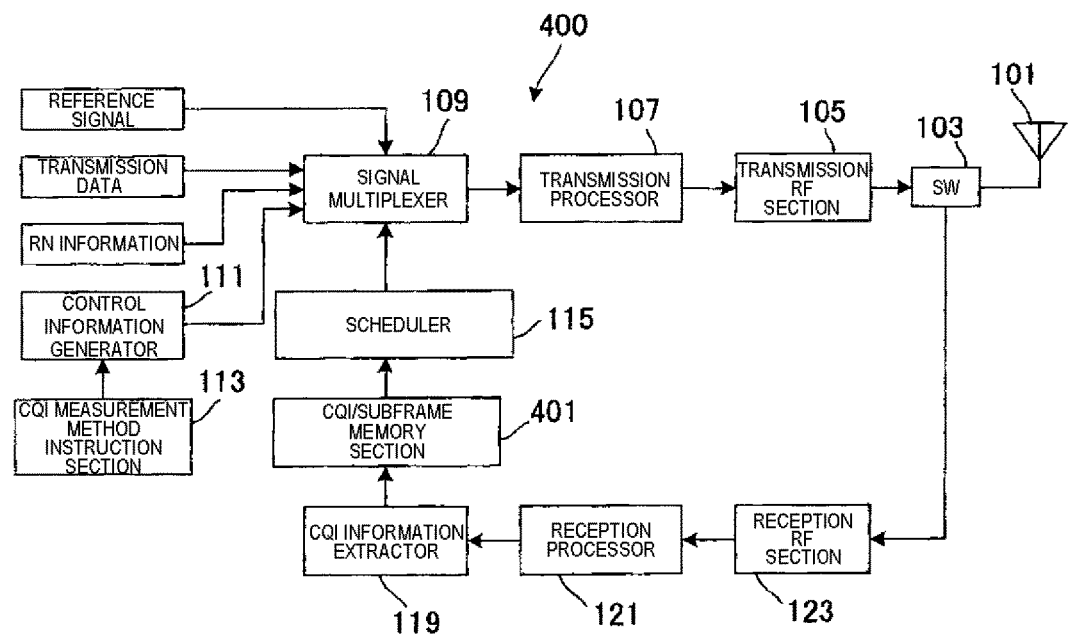
FIG. 12 is a block diagram showing the configuration of a base station 400 in the first modification.

Next, referring to FIG. 12, the configuration of the base station 400 as eNB will be described. FIG. 12 is a block diagram showing the configuration of the base station 400 in the first modification. The base station 400 shown in FIG. 12 is different from the base station 100 shown in FIG. 7 in that a CQI/subframe memory section 401 is provided instead of the CQI memory section 117. Except for this, the configuration is similar to that of the embodiment, and in FIG. 12, elements in common with FIG. 7 are denoted by the same reference numerals. Moreover, descriptions of the common elements are omitted.

The CQI/subframe memory section 401 stores the subframe information fed back from UE1 and the CQI related to the channel (the channel of the own cell) from eNB to UE1 in the subframe which information and CQI are extracted by the CQI information extractor 119, and outputs them to the scheduler 115.

Figure 13:
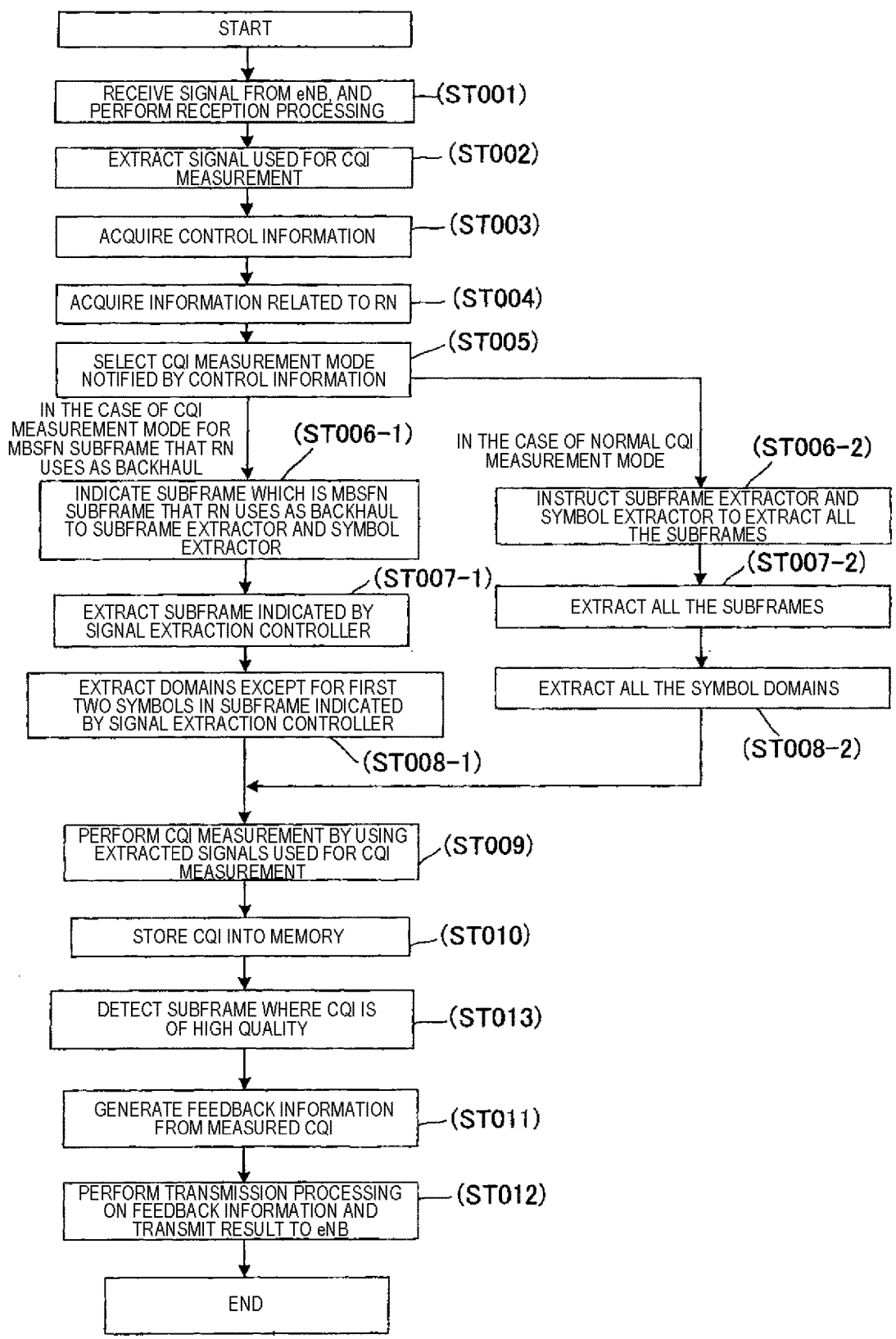
FIG. 13 is a diagram showing the processing flow of the CQI measurement at the wireless communication terminal 600 in the first modification.

Next, referring to FIG. 13, the processing flow of the CQI measurement at the wireless communication terminal 600 (UE1) in the first modification will be described. FIG. 13 is a diagram showing the processing flow of the CQI measurement at the wireless communication terminal 600 in the first modification. The processing flow of the CQI measurement at the wireless communication terminal 600 shown in FIG. 13 is different from the processing flow of the CQI measurement at the wireless communication terminal 300A shown in FIG. 8 in that the processing of step (ST013) is newly added between step (ST010) and step (ST011). Except for this, the processing flow is similar to that of the embodiment, and in FIG. 13, steps in common with FIG. 8 are denoted by the same reference numerals. Moreover, descriptions of the common steps are omitted.

At step (ST013), the high quality subframe detector 601 detects the subframe where the quality is high in the CQI stored at step (ST010). Then, at (ST011), the feedback information generator 603 generates feedback information from the CQI stored at step (ST010) and the subframe information detected at (ST013).

While in the first modification of the present invention, eNB notifies UE1 under its own control of the position of the "MBSFN subframe that RN uses as the backhaul" at all the connected RNs, the present invention is not limited thereto. For example, eNB notifies UE1 under the control of eNB of the number of each RN and the position of the MBSFN subframe used as the backhaul by each RN which position is associated with the number of the RN. Then, the UE1 detects the subframe where the CQI is the highest, and detects by which RN the subframe is used as the MBSFN subframe used as the backhaul, thereby feeding back the position of the subframe or the RN number and the measured CQI to eNB.

As described above, by eNB notifying UE1 under its own control of the position of the "MBSFN subframe that RN uses as the backhaul" for each RN to thereby average the CQIs measured at the MBSFN subframes used as the backhaul by the same RN, the accuracy of measurement of the CQI can be improved.

(Second Modification)

Next, referring to FIGS. 14 to 19, a second modification of the present embodiment will be described.

In the embodiment and the first modification, eNB notifies UE1 of the position of the "MBSFN subframe that RN uses as the backhaul", and UE1 switches the CQI measurement mode based on the notified information. However, in the second modification of the present embodiment, UE1 itself determines whether the subframe is the "MBSFN subframe that RN uses as the backhaul" or not.

Figure 14:
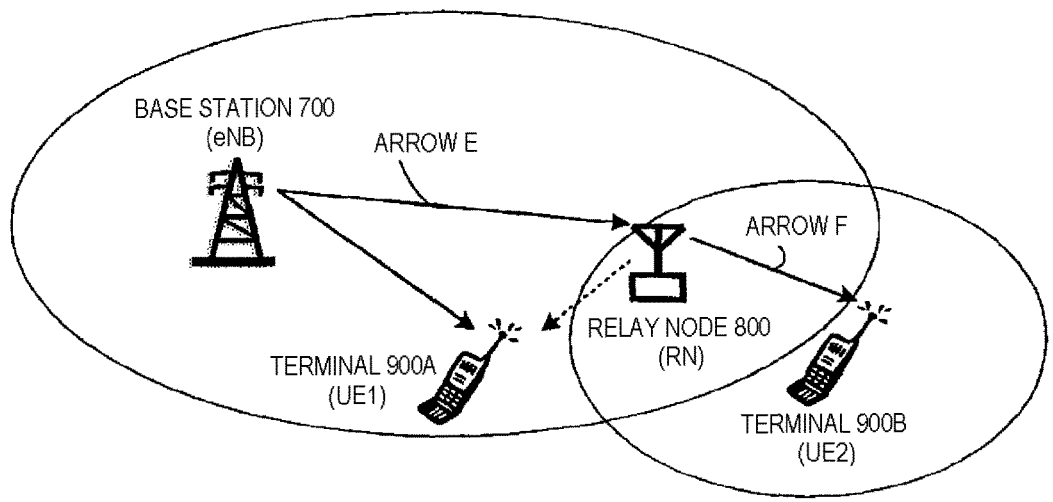
FIG. 14 is a diagram showing a wireless communication system that relays radio signals by using the relay technology in the second modification.

FIG. 14 is a diagram showing a wireless communication system that relays radio signals by using the relay technology in the second modification. In the second modification, in FIG. 14, eNB represents a base station 700, RN represents a relay node 800, UE1 represents a wireless communication terminal 900A, and UE2 represents a wireless communication terminal 900B. The wireless communication terminal 900A (UE1) is a wireless communication terminal connected to the base station 700, and the wireless communication terminal 900B (UE2) is a wireless communication terminal connected to the relay node 800 (RN). The wireless communication terminal 900A (UE1) is the wireless communication terminal (UE1) under the control of the base station 700.

Hereinafter, for purposes of explanation, the base station 700 will be referred to as eNB; the relay node 800, as RN; and the wireless communication terminal 900A (UE1), as UE1. Moreover, hereinafter, in the second modification, a case will be described where radio signals are relayed as shown in FIG. 1. That is, RN receives signals from eNB on the backhaul channel (the arrow E in the figure), and transmits the signals to UE2 on the access channel of RN (the arrow F in the figure). The relay method is such that the backhaul channel and the access channel are accommodated in the same frequency bandwidth and the backhaul channel and the access channel of RN are allocated while being divided by the time domain (in units of subframes).

Here, it is assumed that the relay node 800 (RN) has an individual cell ID studied in LTE-A. Therefore, the relay node 800 (RN) adjacent to the wireless communication terminal 900A (UE1) can be regarded as a neighbor cell when viewed from the wireless communication terminal 900A.

Figure 15:
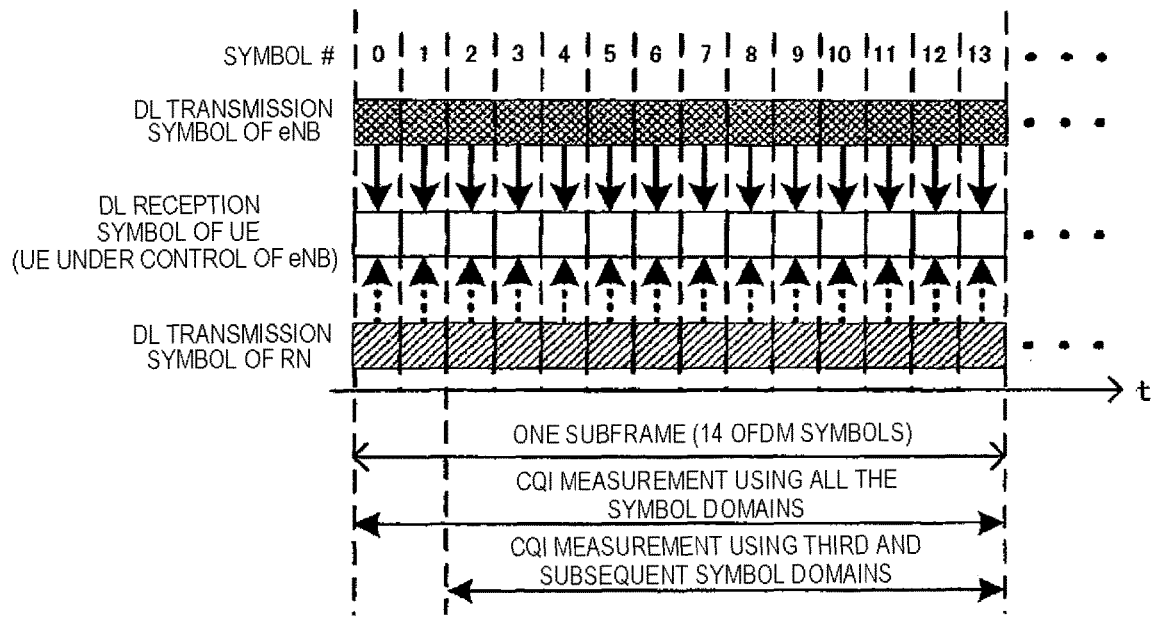
FIG. 15 is a diagram showing an example of symbols of a subframe on the downlink channel in the second modification.
Figure 16:
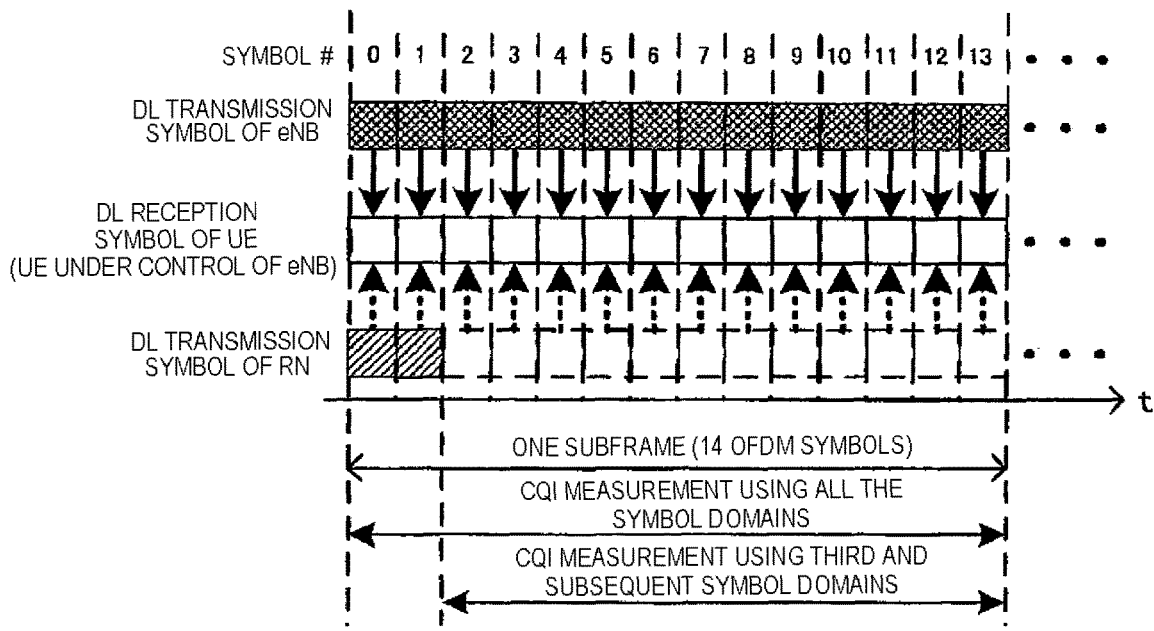
FIG. 16 is a diagram showing another example of symbols of a subframe on the downlink channel in the second modification.

Referring to FIGS. 15 and 16, a method will be described in which UE1 itself determines whether the subframe is the "MBSFN subframe that RN uses as the backhaul" or not. FIG. 15 shows an example of symbols of a subframe on the downlink channel in the second modification. FIG. 16 shows another example of symbols of a subframe on the downlink channel in the second modification.

As shown in FIG. 15, signals are transmitted from RN at all the symbols. For this reason, whichever symbol of this subframe is used to measure the CQI related to the channel (the channel of the own cell) from eNB to UE1, the CQIs show close values. That is, the CQI related to the channel (the channel of the own cell) from eNB to UE1 measured by using the domains of all the symbols and the CQI related to the channel (the channel of the own cell) from eNB to UE1 measured by using the third and subsequent symbols are close values.

On the other hand, as shown in FIG. 16, at the third (symbol #2) and subsequent symbols, no signal is transmitted from RN to eNB. For this reason, in the subframe shown in FIG. 16, the amount of interference that UE1 receives from RN is different between when the CQI related to the channel (the channel of the own cell) from eNB to UE1 is measured with the first two symbols being included and when the CQI of eNB is measured by using the third and subsequent symbols. That is, the CQI related to the channel (the channel of the own cell) from eNB to UE1 measured by using the third and subsequent symbols in the subframe shown in FIG. 16 assumes a value showing higher channel quality than the CQI related to the channel (the channel of the own cell) from eNB to UE1 measured by using the first two symbols and the third and subsequent symbols in the subframe shown in FIG. 16. That is, between the CQI related to the channel (the channel of the own cell) from eNB to UE1 measured by using the domains of all the symbols and the CQI related to the channel (the channel of the own cell) from eNB to UE1 measured by using the third and subsequent symbols, the latter assumes a value showing higher channel quality.

Therefore, by comparing the CQI related to the channel (the channel of the own cell) from eNB to UE1 measured by using the domains of all the symbols and the CQI related to the channel (the channel of the own cell) from eNB to UE1 measured by using the third and subsequent symbols, UE1 itself can determine whether the subframe is the normal subframe or the "MBSFN subframe that RN uses as the backhaul". Moreover, by comparing the CQI related to the channel (the channel of the own cell) from eNB to UE1 measured by using only the first two symbols and the CQI related to the channel (the channel of the own cell) from eNB to UE1 measured by using only the third and subsequent symbols, UE1 itself can similarly determine whether the subframe is the normal subframe or the "MBSFN subframe that RN uses as the backhaul".

As described above, in the second modification of the present embodiment, UE1 compares the CQI related to the channel (the channel of the own cell) from eNB to UE1 measured by using the first two symbols and the CQI related to the channel (the channel of the own cell) from eNB to UE1 measured by using the third and subsequent symbols to determine whether the subframe of RN is the normal subframe or the "MBSFN subframe that RN uses as the backhaul", and UE1 performs the measurement of the CQI of eNB suitable for each and feeds back the result to eNB.

Hereinafter, a concrete method will be described for UE1 itself determining whether the subframe of RN is the normal subframe or the "MBSFN subframe that RN uses as the backhaul".

First, UE1 measures the CQI related to the channel (the channel of the own cell) from eNB to UE1 by using all the symbol domains, and then, measures the CQI related to the channel (the channel of the own cell) from eNB to UE1 by using the domains of the third and subsequent symbols. Hereinafter, for purposes of explanation, the CQI related to the channel (the channel of the own cell) from eNB to UE1 measured by using all the symbol domains will be referred to as CQI_all and the CQI related to the channel (the channel of the own cell) from eNB to UE1 measured by using the domains of the third and subsequent symbols, as CQI_part.

In the present description, the underscore "_" subsequent to "CQI" represents that the letters or the word (e.g. all and part) subsequent to the underscore _ is subscripts of the "CQI" immediately preceding the underscore _.

Then, UE1 compares CQI_all and CQI_part to determine whether the subframe of RN is the normal subframe or the "MBSFN subframe that RN uses as the backhaul". For example, UE1 can determine whether the subframe of RN is the normal subframe or the subframe of RN is the "MBSFN subframe that RN uses as the backhaul" by presetting a threshold value Th for the absolute value of the difference between CQI_all and CQI_part (hereinafter, referred to as CQI difference) and comparing the CQI difference with the threshold value Th.

That is, when the CQI difference is less than the threshold Th, UE1 determines that there is no difference between CQI_all and CQI_part, and determines that the subframe of RN is the normal subframe. On the other hand, when the CQI difference is equal to or more than the threshold value Th, UE1 determines that there is a difference between CQI_all and CQI_part, and UE1 determines that the subframe of RN is the "MBSFN subframe that RN uses as the backhaul".

The determination condition expressed by the above-described CQI difference and the threshold value Th is expressed by the following expression (1) and expression (2) by using CQI_all and CQI_part:

[Expression 1]

$$|CQI_{part} - CQI_{all}| < Th \quad \text{expression (1)}$$

[Expression 2]

$$|CQI_{part} - CQI_{all}| \geq Th \quad \text{expression (2)}$$

That is, when CQI_all, CQI_part and the threshold value Th satisfy the expression (1), UE1 determines that the subframe of RN is the normal subframe. On the other hand, when CQI_all, CQI_part and the threshold value Th satisfy the expression (2), UE1 determines that the subframe of RN is the "MBSFN subframe that RN uses as the backhaul".

Then, according to the subframe of RN determined by using the expression (1) and the expression (2), UE1 selects the CQI measurement method, for example, as follows:

When UE1 determines that the subframe of RN is the normal subframe, since the quality is the same among the symbols in the subframe, the accuracy of the CQI measurement can be improved by performing averaging by using a multitude of symbols. Therefore, UE1 selects the CQI measurement method using all the domains of the subframe, and measures the CQI related to the channel (the channel of the own cell) from eNB to UE1. On the other hand, when UE1 determines that the subframe of RN is the "MBSFN subframe that RN uses as the backhaul", as in the first modification, UE1 selects the CQI measurement mode using the domains of the third and subsequent symbols except for the first two symbols, and measures the CQI related to the channel (the channel of the own cell) from eNB to UE1.

Then, UE1 feeds back in which mode the measurement was performed, to eNB as feedback information together with the measured CQI.

Moreover, when the CQI measured by using only the first two symbols and the CQI measured by using only the third and subsequent symbols are compared, for example, the following solution is available:

When a downlink channel reference signal is used for the CQI measurement, first, at UE1, CQI measurement is performed, as the CQI measurement using the first two symbols, by using the reference signal inserted in the symbol #0 and, as the CQI measurement using the third and subsequent symbols, by using the reference signal inserted in the symbol #7. As the result of the CQI measurement, CQI_sym0 and CQI_sym7 are each shown.

Then, by comparing these CQI_sym0 and CQI_sym7, it is determined whether the subframe of RN is the normal subframe or the "MBSFN subframe that RN uses as the backhaul". For example, by presetting a threshold value Th_sym for the absolute value of the difference between CQI_sym0 and CQI_sym7 (hereinafter, referred to as CQI_sym difference) and by comparing CQI_sym difference with the threshold value Th_sym, UE1 can determine whether the subframe of RN is the normal subframe or the "MBSFN subframe that RN uses as the backhaul".

That is, when the CQI_sym difference is less than the threshold value Th_sym, since there is no difference between CQI_sym0 and CQI_sym7, UE1 determines that the quality is the same among the symbols in the subframe, and UE1 determines that the subframe of RN is the normal subframe. On the other hand, when the CQI_sym difference is equal to or more than the threshold value Th_sym, UE1 determines that there is a quality difference between the first two symbols and the third and subsequent symbols since there is a difference between CQI_sym0 and CQI_sym7, and UE1 determines that the subframe of RN is the "MBSFN subframe that RN uses as the backhaul".

The determination condition expressed by the above-described CQI_sym difference and the threshold value Th_sym is expressed by the following expression (3) and expression (4) by using CQI_sym0, CQI_sym7 and Th_sym:

[Expression 3]

$$|CQI_{sym7} - CQI_{sym0}| < Th_{sym} \quad \text{expression (3)}$$

[Expression 4]

$$|CQI_{sym7} - CQI_{sym0}| \geq Th_{sym} \quad \text{expression (4)}$$

That is, when CQI_sym0, CQI_sym7 and Th_sym satisfy the expression (3), UE1 determines that the subframe of RN is the normal subframe. On the other hand, when CQI_sym0, CQI_sym7 and Th_sym satisfy the expression (4), UE1 determines that the subframe of RN is the "MBSFN subframe that RN uses as the backhaul".

Then, according to the subframe of RN determined by UE1, the CQI measurement method is selected. When the subframe of RN is the normal subframe, since the quality is the same among the symbols in the subframe, the accuracy of the CQI measurement can be improved by performing averaging by using a multitude of symbols, and for this reason, UE1 selects the CQI measurement method using all the domains of the subframe, and measures the CQI related to the channel (the channel of the own cell) from eNB to UE1. On the other hand, when the subframe of RN is the "MBSFN subframe that RN uses as the backhaul", as in the first modification, UE1 selects the CQI measurement mode using the domains of the third and subsequent symbols except for the first two symbols, and measures the CQI related to the channel (the channel of the own cell) from eNB to UE1. UE1 feeds back in which mode the measurement was performed, to eNB as feedback information together with the measured CQI.

As described above, in the second modification of the present embodiment, UE1 compares the CQI related to the channel (the channel of the own cell) from eNB to UE1 measured by using the first two symbols and the CQI related to the channel (the channel of the own cell) from eNB to UE1 measured by using the third and subsequent symbols. Then, based on the result of the comparison, UE1 determines whether the subframe of RN is the normal subframe or the "MBSFN subframe that RN uses as the backhaul". Further, based on the result of the determination, UE1 performs the measurement of the CQI of eNB suitable for each, and feeds back in which mode the measurement was performed, to eNB as feedback information together with the measured CQI. Consequently, at UE1 under the control of eNB, the CQI related to the channel (the channel of the own cell) from eNB to UE1 when there is no interference from RN can be accurately measured. Moreover, it is unnecessary for eNB to notify UE1 of the information related to RN, and compared with the present embodiment, in the second modification, the overhead of signaling on the downlink channel can be more reduced.

Figure 17:
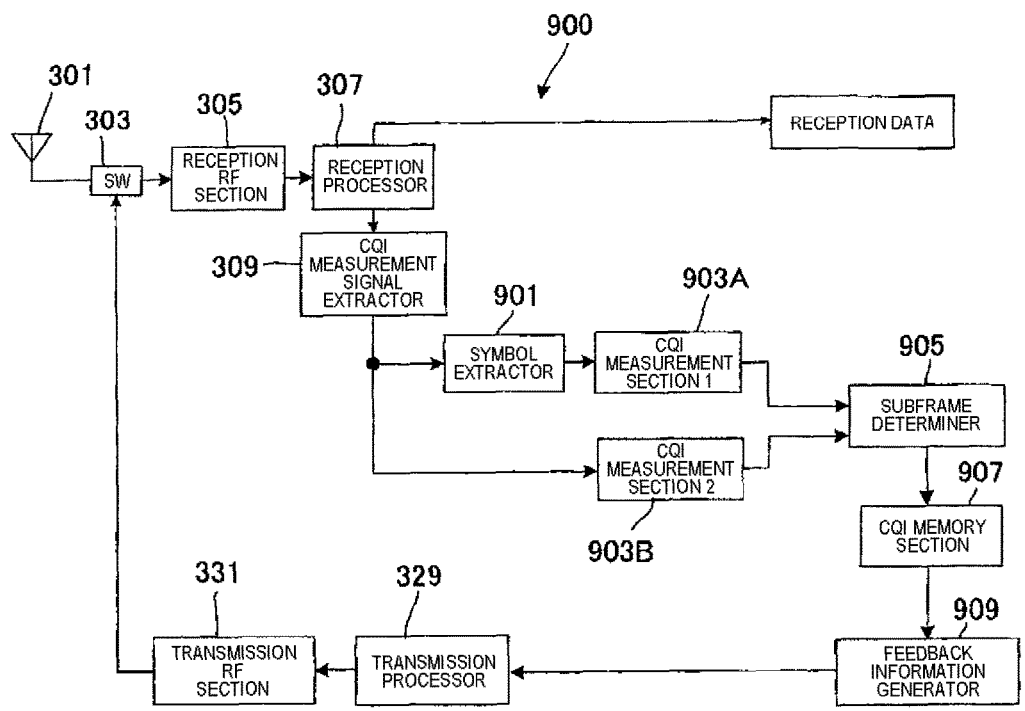
FIG. 17 is a block diagram showing the configuration of a wireless communication terminal 900 in the second modification.

Next, referring to FIG. 17, the configuration of the wireless communication terminal 900 in the second modification will be described. FIG. 17 is a block diagram showing the configuration of the wireless communication terminal 900 in the second modification. The wireless communication terminal 900 shown in FIG. 17 includes the antenna 301, the switch (SW) 303, the reception RF section 305, the reception processor 307, the CQI measurement signal extractor 309, a symbol extractor 901, a CQI measurement section 903A, a CQI measurement section 903B, a subframe determiner 905, a CQI memory section 907, a feedback information generator 909, the transmission processor 329, and the transmission RF section 331.

The wireless communication terminal 900 shown in FIG. 17 is different from the wireless communication terminal 300A shown in FIG. 6 in the symbol extractor 901, the CQI measurement section 903A, the CQI measurement section 903B, the subframe determiner 905, the CQI memory section 907 and the feedback information generator 909. Except for these, the configuration is similar to that of the embodiment, and in FIG. 17, elements in common with FIG. 6 are denoted by the same reference numerals. Moreover, descriptions of the common elements are omitted.

The symbol extractor 901 extracts the signals of the domains of the third and subsequent symbols except for the first two symbols, from the signals used for the CQI measurement which signals are extracted from the CQI measurement signal extractor 309, and outputs them to the CQI measurement section 903A.

The CQI measurement section 903A inputs the signals used for the CQI measurement of the domains of the third and subsequent symbols which signals are extracted by the symbol extractor 901, measures the CQI when the subframe is the "MBSFN subframe that RN uses as the backhaul" as in the embodiment, and outputs the measured CQI to the subframe determiner 905.

The CQI measurement section 903B inputs the signals used for the CQI measurement, performs the CQI measurement by using all the symbols, and outputs the measured CQI to the subframe determiner 905.

The subframe determiner 905 compares the CQIs measured by the CQI measurement section 903A and the CQI measurement section 903B, and determines whether the subframe of RN is the normal subframe or the "MBSFN subframe that RN uses as the backhaul". Then, the subframe determiner 905 outputs the CQI to the CQI memory section 907 together with the result of the determination.

When the subframe determiner 905 determines that the subframe of RN is the normal subframe, the CQI measurement result from the CQI measurement section 903B is outputted to the CQI memory section 907. On the other hand, when the subframe determiner 905 determines that the subframe of RN is the "MBSFN subframe that RN uses as the backhaul", the CQI measurement result from the CQI measurement section 903A is outputted to the CQI memory section 907.

The CQI memory section 907 stores the value of the CQI inputted from the subframe determiner 905 and the result of the determination of the subframe of RN, and outputs them to the feedback information generator 909.

The feedback information generator 909 generates the feedback information to be fed back to the base station 700, by using the CQI and the result of the determination of the subframe of RN stored in the CQI memory section 907, and outputs it to the transmission processor 329.

Figure 18:
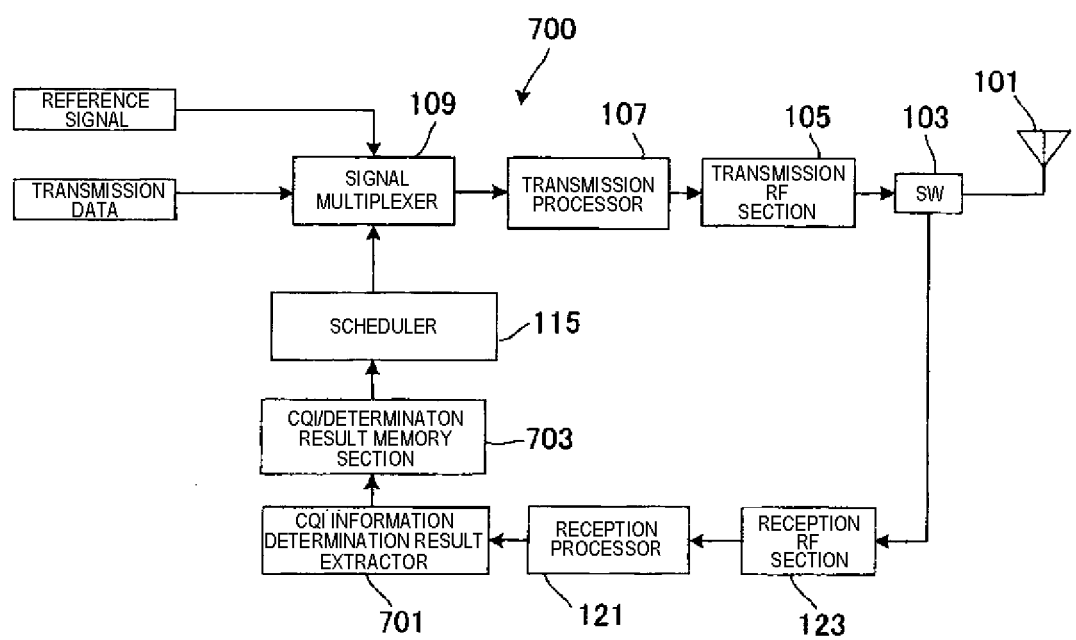
FIG. 18 is a block diagram showing the configuration of a base station 700 in the second modification.

Next, referring to FIG. 18, the configuration of the base station 700 will be described. FIG. 18 is a block diagram showing the configuration of the base station 700 in the second modification. The base station 700 shown in FIG. 18 is different from the base station 100 shown in FIG. 7 in that instead of the CQI information extractor 119 and the CQI memory section 117, a CQI information/determination result extractor 701 and a CQI/determination result memory section 703 are present and that the RN information and the CQI measurement method instruction section 113 are absent. Except for these, the configuration is similar to that of the embodiment, and in FIG. 18, elements in common with FIG. 7 are denoted by the same reference numerals. Moreover, descriptions of the common elements are omitted.

The CQI information/determination result extractor 701 extracts the subframe information fed back from the wireless communication terminal 900 and the CQI in the subframe, from the control information separated by the reception processor 121, and outputs them to the CQI/determination result memory section 703.

The CQI/determination result memory section 703 stores the subframe information fed back from the wireless communication terminal 900 and the CQI in the subframe, and outputs them to the scheduler 115.

Figure 19:
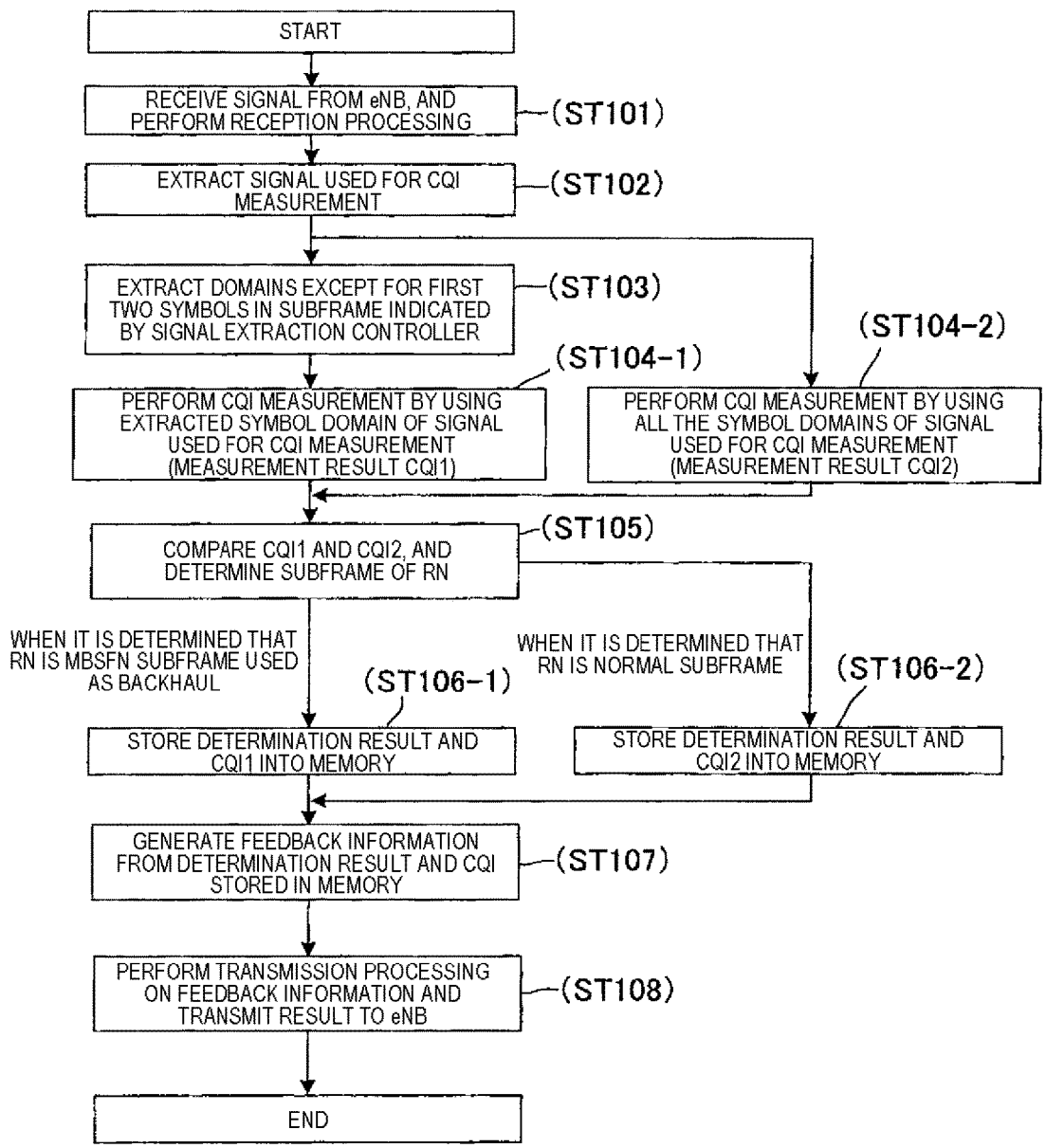
FIG. 19 is a diagram showing the processing flow of the CQI measurement of the wireless communication terminal 900 in the second modification.
Figure 20:
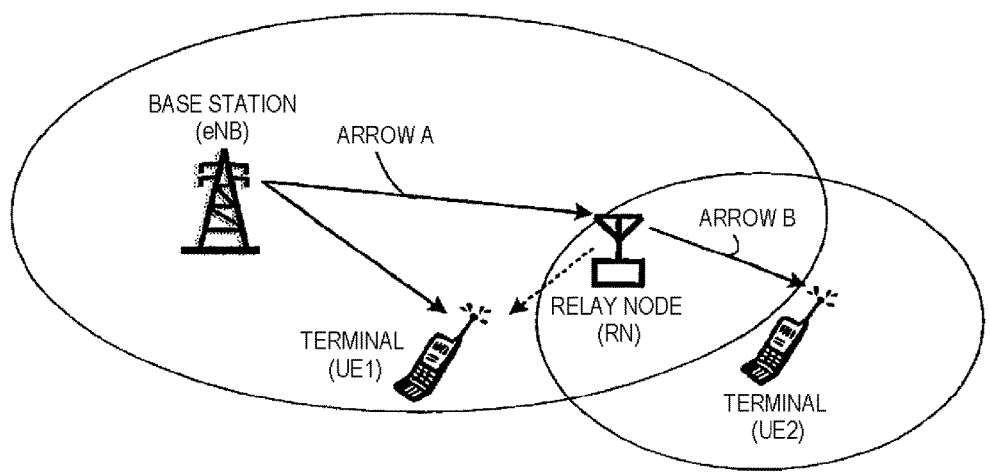
FIG. 20 is a diagram showing the wireless communication system that relays radio signals by using the relay technology.
Figure 21:
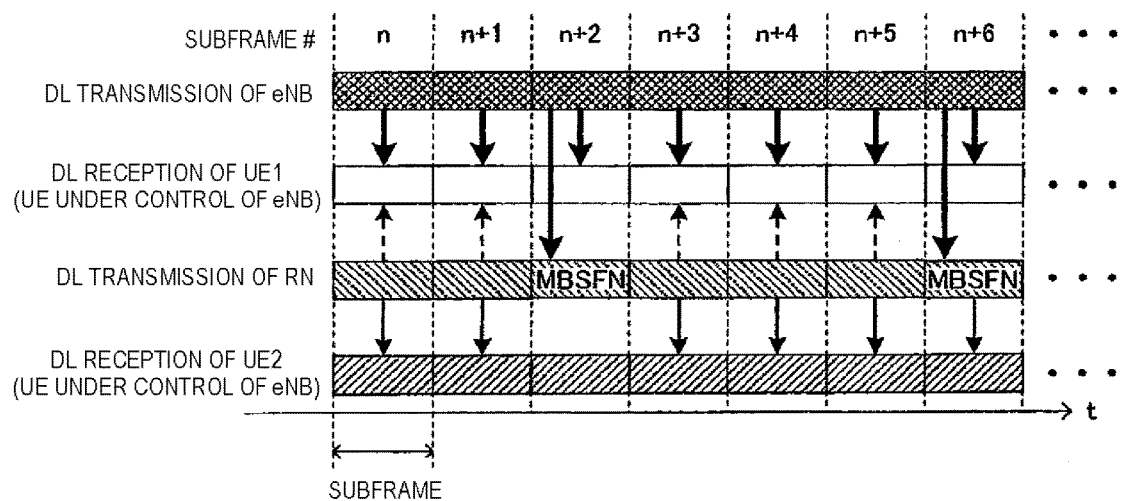
FIG. 21 is a diagram showing the subframe structure on the downlink channel in the relay method.

Next, referring to FIG. 19, the processing flow of the CQI measurement of the wireless communication terminal 900 (UE1) in the second modification will be described. FIG. 19 is a diagram showing the processing flow of the CQI measurement of the wireless communication terminal 900 in the second modification.

At step (ST101), the antenna 301 receives the signal from eNB, and the reception RF section 305 and the reception processor 307 perform reception processing.

At step (ST102), the CQI measurement signal extractor 309 extracts the signal used for the CQI measurement from the signal having undergone the reception processing at step (ST101).

At step (ST103), the symbol extractor 901 extracts the symbols of the domains except for the first two symbols in the signal used for the CQI measurement extracted at step (ST102).

At step (ST104-1), the CQI measurement section 903A performs the CQI measurement by using the signal extracted at step (ST103). The result of the CQI measurement by the CQI measurement section 903A will be referred to as CQI1.

At step (ST104-2), the CQI measurement section 903B performs the CQI measurement by using the signals of all the symbol domains at the signal used for the CQI measurement extracted at step (ST102). The result of the CQI measurement by the CQI measurement section 903B will be referred to as CQI2.

At step (ST105), the subframe determiner 905 compares CQI1 and CQI2 which are the measurement results of the CQIs measured at step (ST104-1) and step (ST104-2), and determines whether the subframe of RN is the normal subframe or the "MBSFN subframe that RN uses as the backhaul". Examples of the determination method include a method in which the determination is performed by using the expression (1) and the expression (2) and a method in which the determination is performed by using the expression (3) and the expression (4).

At step (ST106-1), when it is determined that the subframe of RN is the "MBSFN subframe that RN uses as the backhaul" at step (ST105), the CQI memory section 907 stores the result of the determination and CQI1.

At step (ST106-2), when it is determined that the subframe of RN is the normal subframe at step (ST105), the CQI memory section 907 stores the result of the determination and CQI2.

At step (ST107), the feedback information generator 909 generates feedback information from the result of the subframe determination and the value of the CQI stored at step (ST106-1) or step (ST106-2).

At step (ST108), the transmission processor 329 and the transmission RF section 331 performs transmission processing on the feedback information generated at step (ST107), and transmits the result to eNB.

As described above, in the second modification of the present embodiment, UE1 compares the CQI of eNB measured by using the first two symbols and the CQI of eNB measured by using the third and subsequent symbols and determines whether the subframe of RN is the normal subframe or the "MBSFN subframe that RN uses as the backhaul", and UE1 performs the measurement of the CQI of eNB suitable for each and feeds back the result to eNB.

Consequently, at UE1 under the control of eNB, the CQI when there is no interference from RN can be accurately measured. Moreover, since it is unnecessary for eNB to notify UE1 of the information related to RN, compared with the present embodiment, the overhead of signaling on the downlink channel can be reduced.

While description is given as an antenna in the above embodiment, the present invention is similarly applicable in the case of an antenna port. The antenna port refers to a logical antenna including one or more than one physical antenna. That is, the antenna port does not always refer to one physical antenna but sometimes refers to an array antenna or the like including a plurality of antennas. For example, in LTE, how many physical antennas an antenna port includes is not defined, and reference signals of different base stations are defined as minimum units that can be transmitted. Moreover, the antenna port is sometimes defined as a minimum unit that is multiplied by the weighting of a precoding vector.

Moreover, the functional blocks used for the description of the embodiment are typically implemented as an LSI which is an integrated circuit. These may be individually formed as one chip or may be formed as one chip so as to include some or all. While an LSI is cited in this description, it is sometimes called an IC, a system LSI, a super LSI or an ultra LSI according to the difference in integration degree.

Moreover, the method of circuit integration is not limited to an LSI; the functional blocks may be implemented as a dedicated circuit or a general purpose processor. After the manufacture of an LSI, a programmable FPGA (Field Programmable Gate Array) or a reconfigurable processor where the connection and setting of the circuit cells in the LSI are reconfigurable may be used.

Further, it is to be noted that when a circuit integration technology that replaces the LSI appears by the progress of the semiconductor technology or a derivative other technology, the functional blocks may be integrated by using the technology. Biotechnology adaptation or the like can be a possible one.

While the present invention has been described in detail with reference to a specific embodiment, it is obvious to one of ordinary skill in the art that various changes and modifications may be added without departing from the spirit and scope of the present invention.

The present application is based on Japanese Patent Application (Patent Application No. 2009-119104) filed on May 15, 2009, the contents of which are incorporated herein by reference.

INDUSTRIAL APPLICABILITY

The wireless communication terminal and the communication method according to the present invention have the effect that the channel quality of the own cell when there is no interference from a neighbor cell can be accurately measured, and are useful as a wireless communication terminal or the like that transmits and receives data to and from a base station.

REFERENCE SIGNS LIST 100, 400, 700: Base station
105: Transmission RF section
107: Transmission processor
109: Signal multiplexer
111: Control information generator
113: CQI measurement method instruction section
115: Scheduler
117: CQI memory section
119: CQI information extractor
121: Reception processor
123: Reception RF section
200, 500A, 500B, 800: Relay node
300A, 300B, 600, 900A, 900B: Wireless communication terminal
301: Antenna
303: Switch (SW)
305: Reception RF section
307: Reception processor
309: CQI measurement signal extractor
311: RN information acquisition section
313: Signal extraction controller
315: Subframe extractor
317: Control information acquisition section
319: CQI measurement controller
321: Symbol extractor
323: CQI measurement section
325: CQI memory section
327: Feedback information generator
329: Transmission processor
331: Transmission RF section
401: CQI/subframe memory section
601: High quality subframe detector 603: Feedback information generator
701: CQI information/determination result extractor
703: CQI/determination result memory section
901: Symbol extractor
903A: CQI measurement section
903B: CQI measurement section
905: Subframe determiner
907: CQI memory section
909: Feedback information generator

The invention claimed is:

1. A communication apparatus communicating with a terminal that receives signals from a first cell of the communication apparatus to which the terminal belongs and from a second cell comprising:
 a transmitter, which, in operation, transmits, to the terminal, information indicating subframes that include a subframe in which no downlink data is transmitted by the second cell, and transmits, to the terminal, a reference signal on the subframe in which no downlink data is transmitted by the second cell; and
 a receiver, which, in operation, receives a Channel Quality Indicator (CQI), which the terminal measures using the reference signal, the CQI being measured for a subframe, in which the second cell causes no interference to the first cell to which the terminal belongs, based on said information.

2. The communication apparatus according to claim 1, wherein the second cell is neighbour cell to the first cell to which the terminal belongs.

3. The communication apparatus according to claim 1, wherein the second cell causes interference to the first cell to which the terminal belongs.

4. The communication apparatus according to claim 1, wherein the subframe is a Multicast/Broadcast over Single Frequency Network (MBSFN) subframe.

5. The communication apparatus according to claim 1, wherein the subframes indicated by said information are different depending on a cell.

6. The communication apparatus according to claim 1, wherein the transmitter, in operation, transmits the reference signal mapped on or after the third symbol in a subframe.

7. The communication apparatus according to claim 1, wherein the transmitter, in operation, transmits the reference signal mapped on the seventh symbol in a subframe.

8. A communication method for communicating with a terminal that receives signals from a first cell to which the terminal belongs and from a second cell comprising:
 transmitting, to the terminal, information indicating subframes that include a subframe in which no downlink data is transmitted by the second cell, and transmits, to the terminal, a reference signal on the subframe in which no downlink data is transmitted by the second cell; and
 receiving a Channel Quality Indicator (CQI), which the terminal measures using the reference signal, the CQI being measured for a subframe, in which the second cell causes no interference to the first cell to which the terminal belongs, based on said information.

9. The communication method according to claim 8, wherein the second cell is neighbour cell to the first cell to which the terminal belongs.

10. The communication method according to claim 8, wherein the second cell causes interference to the first cell to which the terminal belongs.

11. The communication method according to claim 8, wherein the subframe is a Multicast/Broadcast over Single Frequency Network (MBSFN) subframe.

12. The communication method according to claim 8, wherein the subframes indicated by said information are different depending on a cell.

13. The communication method according to claim 8, wherein the transmitting includes transmitting of the reference signal mapped on or after the third symbol in a subframe.

14. The communication method according to claim 8, wherein the transmitting includes transmitting of the reference signal mapped on the seventh symbol in a subframe.

* * * * *